(12) United States Patent
Nakajima et al.

(10) Patent No.: US 11,492,552 B2
(45) Date of Patent: Nov. 8, 2022

(54) POLYMERIZABLE LIQUID CRYSTAL MATERIAL, POLYMERIZABLE LIQUID CRYSTAL COMPOSITION, POLYMER, OPTICAL FILM, OPTICALLY ANISOTROPIC BODY, POLARIZING PLATE, ANTI-REFLECTION FILM, DISPLAY DEVICE, AND METHOD OF PRODUCING POLYMERIZABLE LIQUID CRYSTAL COMPOSITION

(71) Applicant: ZEON CORPORATION, Tokyo (JP)

(72) Inventors: Shunpei Nakajima, Tokyo (JP); Kei Sakamoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 103 days.

(21) Appl. No.: 16/638,465

(22) PCT Filed: Jul. 23, 2018

(86) PCT No.: PCT/JP2018/027552
§ 371 (c)(1),
(2) Date: Feb. 12, 2020

(87) PCT Pub. No.: WO2019/039165
PCT Pub. Date: Feb. 28, 2019

(65) Prior Publication Data
US 2020/0369958 A1 Nov. 26, 2020

(30) Foreign Application Priority Data
Aug. 23, 2017 (JP) .............................. JP2017-160177

(51) Int. Cl.
*G02F 1/1333* (2006.01)
*C09K 19/38* (2006.01)
*C09K 19/20* (2006.01)
*C09K 19/30* (2006.01)
*C09K 19/34* (2006.01)
*C09K 19/52* (2006.01)

(52) U.S. Cl.
CPC ...... *C09K 19/3809* (2013.01); *C09K 19/2007* (2013.01); *C09K 19/3068* (2013.01); *C09K 19/3405* (2013.01); *C09K 19/3497* (2013.01); *C09K 2019/3408* (2013.01); *C09K 2019/525* (2013.01); *C09K 2019/528* (2013.01); *C09K 2323/035* (2020.08)

(58) Field of Classification Search
CPC ............ C09K 19/3809; C09K 19/2007; C09K 19/3068; C09K 19/3405; C09K 19/3497; C09K 19/38; C09K 2323/035; C09K 2019/3408; C09K 2019/525; C09K 2019/528; G02F 1/1333
See application file for complete search history.

(56) References Cited

U.S. PATENT DOCUMENTS

| 5,179,171 A | 1/1993 | Minami et al. |
| 5,202,388 A | 4/1993 | Iio et al. |
| 10,508,072 B2 * | 12/2019 | Okuyama ............... C07C 51/60 |
| 2009/0189120 A1 | 7/2009 | Takeuchi |

(Continued)

FOREIGN PATENT DOCUMENTS

| EP | 1026189 A1 | 8/2000 |
| JP | S6245621 A | 2/1987 |

(Continued)

OTHER PUBLICATIONS

Oct. 23, 2018, International Search Report issued in the International Patent Application No. PCT/JP2018/027552.

(Continued)

*Primary Examiner* — Geraldina Visconti
(74) *Attorney, Agent, or Firm* — Kenja IP Law PC

(57) ABSTRACT

Disclosed is a polymerizable liquid crystal material wherein an amount of a salt represented by the following formula (I) is less than 0.01 parts by mass per 100 parts by mass of a polymerizable liquid crystal compound, and an amount of a nitrogen-containing compound represented by the following formula (II) is 0.01 parts by mass or less per 100 parts by mass of the polymerizable liquid crystal compound. $R^1$ to $R^5$ each independently represent a hydrogen atom or a C1-C7 alkyl group, $R^6$ and $R^7$ represents a hydrogen atom, and X represents $F^-$, $Br^-$, $Cl^-$, $I^-$, $HSO_4^-$, $1/2(HPO_4^{2-})$, $H_2PO_4^-$, $R-C(=O)-O^-$, $1/2(^-O-(C=O)-R'-(C=O)-O^-)$ or $R-SO_3^-$, where R represents a hydrogen atom or a monovalent hydrocarbon group, and R' represents a single bond or a divalent hydrocarbon group.

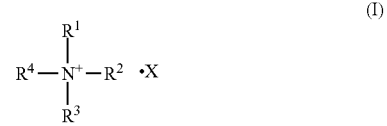

(I)

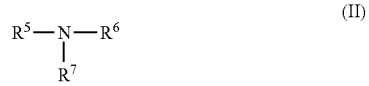

(II)

11 Claims, No Drawings

(56) References Cited

U.S. PATENT DOCUMENTS

| | | |
|---|---|---|
| 2010/0045901 A1 | 2/2010 | Uehira et al. |
| 2014/0107247 A1 | 4/2014 | Sakamoto et al. |
| 2014/0142266 A1 | 5/2014 | Sakamoto et al. |
| 2014/0200320 A1 | 7/2014 | Sakamoto et al. |
| 2015/0175564 A1 | 6/2015 | Sakamoto et al. |
| 2015/0183902 A1 | 7/2015 | Sakamoto et al. |
| 2015/0274647 A1 | 10/2015 | Sakamoto et al. |
| 2015/0274872 A1 | 10/2015 | Sakamoto et al. |
| 2016/0002374 A1 | 1/2016 | Sakamoto et al. |
| 2016/0200841 A1 | 7/2016 | Sakamoto |
| 2016/0257659 A1 | 9/2016 | Sakamoto et al. |
| 2017/0008833 A1 | 1/2017 | Sakamoto et al. |
| 2017/0166815 A1 | 6/2017 | Sakamoto et al. |
| 2017/0335193 A1 | 11/2017 | Sakamoto et al. |
| 2018/0072952 A1 | 3/2018 | Ikeda et al. |
| 2018/0275329 A1 | 9/2018 | Ikeda et al. |
| 2020/0369958 A1 * | 11/2020 | Nakajima ............... C09K 19/38 |

FOREIGN PATENT DOCUMENTS

| | | |
|---|---|---|
| JP | H0597978 A | 4/1993 |
| JP | H05310845 A | 11/1993 |
| JP | H11124429 A | 5/1999 |
| JP | 2007002208 A | 1/2007 |
| JP | 2008273925 A | 11/2008 |
| JP | 2009173893 A | 8/2009 |
| JP | 2009179563 A | 8/2009 |
| JP | 2009274984 A | 11/2009 |
| JP | 2010024438 A | 2/2010 |
| JP | 2010030979 A | 2/2010 |
| JP | 2010031223 A | 2/2010 |
| JP | 2011006360 A | 1/2011 |
| JP | 2011158671 A | 8/2011 |
| JP | 6055569 B1 | 12/2016 |
| TW | 201638314 A | 11/2016 |
| WO | 9920676 A1 | 4/1999 |
| WO | 2009028576 A1 | 3/2009 |
| WO | 2012076679 A1 | 6/2012 |
| WO | 2012141245 A1 | 10/2012 |
| WO | 2012147904 A1 | 11/2012 |
| WO | 2012169424 A1 | 12/2012 |
| WO | 2013180217 A1 | 12/2013 |
| WO | 2014010325 A1 | 1/2014 |
| WO | 2014061709 A1 | 4/2014 |
| WO | 2014065176 A1 | 5/2014 |
| WO | 2014126113 A1 | 8/2014 |
| WO | 2015025793 A1 | 2/2015 |
| WO | 2015064698 A1 | 5/2015 |
| WO | 2015122384 A1 | 8/2015 |
| WO | 2015122385 A1 | 8/2015 |
| WO | 2016148047 A1 | 9/2016 |
| WO | 2017057005 A1 | 4/2017 |
| WO | WO 2017/056501 A1 * | 4/2017 ............. C07C 51/60 |

OTHER PUBLICATIONS

Feb. 25, 2020, International Preliminary Report on Patentability issued in the International Patent Application No. PCT/JP2018/027552.

Apr. 22, 2021, the Extended European Search Report issued by the European Patent Office in the corresponding European Patent Application No. 18848162.6.

* cited by examiner

POLYMERIZABLE LIQUID CRYSTAL MATERIAL, POLYMERIZABLE LIQUID CRYSTAL COMPOSITION, POLYMER, OPTICAL FILM, OPTICALLY ANISOTROPIC BODY, POLARIZING PLATE, ANTI-REFLECTION FILM, DISPLAY DEVICE, AND METHOD OF PRODUCING POLYMERIZABLE LIQUID CRYSTAL COMPOSITION

TECHNICAL FIELD

The present disclosure relates to polymerizable liquid crystal materials, polymerizable liquid crystal compositions, polymers, optical films, optically anisotropic bodies, polarizing plates, anti-reflection films, display devices, and methods of producing a polymerizable liquid crystal composition.

BACKGROUND

Recent improvements in the function of portable information terminals such as mobile PCs and cellular phones and their widespread use are increasingly requiring that flat panel display devices be thinned as much as possible. Correspondingly, it is also required to make thinner the retardation plates which constitute the flat panel display devices.

The method of making thinner retardation plates which is deemed most effective in recent years involves applying a polymerizable liquid crystal composition containing a polymerizable liquid crystal compound on a film substrate to form an optical film.

However, polymerizable liquid crystal compositions obtained by dissolving polymerizable liquid crystal compounds in organic solvents show poor stability and may undergo gelation with time (see, e.g., PTL 1).

CITATION LIST

Patent Literature

PTL 1: JP2011158671A

SUMMARY

Technical Problem

Therefore, there have been demands for polymerizable liquid crystal compositions which do not easily undergo gelation (i.e., have long gelation time).

Solution to Problem

The inventors made extensive studies to solve the problem set forth above and found that the conventional polymerizable liquid crystal compositions tend to undergo gelation due to the presence of certain compounds (impurities) incorporated for example during the preparation of polymerizable liquid crystal compounds. The inventors thus completed the present disclosure.

Specifically, the present disclosure aims to advantageously solve the problem set forth above and provides the polymerizable liquid crystal material, polymerizable liquid crystal composition, polymer, optical film, optically anisotropic body, polarizing plate, anti-reflection film, display device, and method of producing a polymerizable liquid crystal composition as set forth below.

[1] A polymerizable liquid crystal material comprising a polymerizable liquid crystal compound, wherein an amount of a salt represented by the following formula (I) is less than 0.01 parts by mass per 100 parts by mass of the polymerizable liquid crystal compound, and an amount of a nitrogen-containing compound represented by the following formula (II) is 0.01 parts by mass or less per 100 parts by mass of the polymerizable liquid crystal compound,

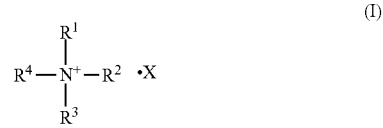

where $R^1$ to $R^4$ each independently represent a hydrogen atom or a C1-C7 alkyl group, and X represents $F^-$, $Br^-$, $Cl^-$, $I^-$, $HSO_4^-$, $1/2(HPO_4^{2-})$, $H_2PO_4^-$, $R-C(=O)-O^-$, $1/2(^-O-(C=O)-R'-(C=O)-O^-)$ or $R-SO_3^-$, where R represents a hydrogen atom or a monovalent hydrocarbon group, and R' represents a single bond or a divalent hydrocarbon group,

where $R^5$ represents a hydrogen atom or a C1-C7 alkyl group, and $R^6$ and $R^7$ represent a hydrogen atom.

[2] The polymerizable liquid crystal material of [1] described above, wherein the polymerizable liquid crystal compound comprises a compound represented by the following formula (III):

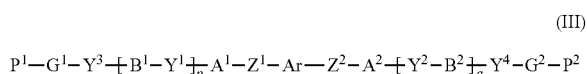

where Ar represents a group represented by any of the following formulas (1) to (7) which may have a substituent:

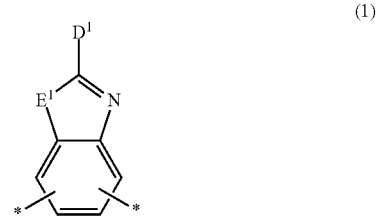

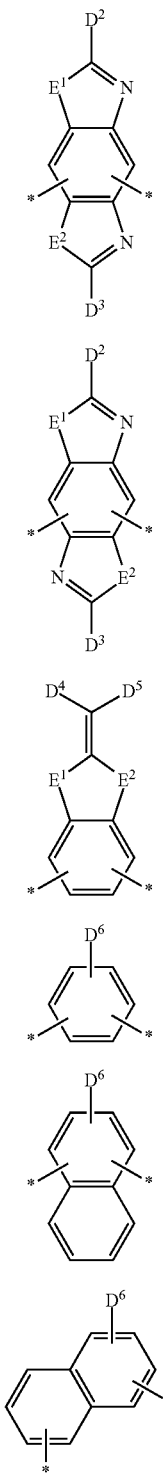

where in formulas (1) to (7), *represents a bond with $Z^1$ or $Z^2$, in formulas (1) to (4), $E^1$ represents —$CR^{11}R^{12}$—, —S—, —$NR^{11}$—, —C(=O)—, or —O—, in formulas (2) to (4), $E^2$ represents —$CR^{11}R^{12}$—, —S—, —$NR^{11}$—, —C(=O)—, or —O—, $R^{11}$ and $R^{12}$ each independently represent a hydrogen atom or a C1-C4 alkyl group, in formula (1), $D^1$ represents an aromatic hydrocarbon ring group which may have a substituent, or an aromatic heterocyclic group which may have a substituent, in formulas (2) and (3), $D^2$ and $D^3$ each independently represent an aromatic hydrocarbon ring group which may have a substituent, or an aromatic heterocyclic group which may have a substituent, in formula (4), $D^4$ and $D^5$ each independently represent an acyclic group which may have a substituent, or an organic group in which $D^4$ and $D^5$ are combined to form a ring, and in formulas (5) to (7), $D^6$ represents —C($R^f$)=N—N($R^g$)$R^h$, —C($R^f$)=N—N=C($R^g$)$R^h$, or —C($R^f$)=N—N=$R^i$, where $R^f$ represents a hydrogen atom or a C1-C6 alkyl group, $R^g$ represents a hydrogen atom or a C1-C30 organic group which may have a substituent, $R^h$ represents an organic group having one or more aromatic rings selected from the group consisting of a C6-C30 aromatic hydrocarbon ring and a C2-C30 aromatic heterocyclic ring, and $R^i$ represents an organic group having one or more aromatic rings selected from the group consisting of a C6-C30 aromatic hydrocarbon ring and a C2-C30 aromatic heterocyclic ring;

$Z^1$ and $Z^2$ each independently represent a single bond, —O—, —O—$CH_2$—, —$CH_2$—O—, —O—$CH_2$—$CH_2$—, —$CH_2$—$CH_2$—O—, —C(=O)—O—, —O—C(=O)—, —C(=O)—S—, —S—C(=O)—, —$NR^{21}$—C(=O)—, —C(=O)—$NR^{21}$—, —$CF_2$—O—, —O—$CF_2$—, —$CH_2$—$CH_2$—, —$CF_2$—$CF_2$—, —O—$CH_2$—$CH_2$—O—, —CH=CH—C(=O)—O—, —O—C(=O)—CH=CH—, —$CH_2$—C(=O)—O—, —O—C(=O)—$CH_2$—, —$CH_2$—O—C(=O)—, —C(=O)—O—$CH_2$—, —$CH_2$—$CH_2$—C(=O)—O—, —O—C(=O)—$CH_2$—$CH_2$—, —$CH_2$—$CH_2$—O—C(=O)—, —C(=O)—O—$CH_2$—$CH_2$—, —CH=CH—, —N=CH—, —CH=N—, —N=C($CH_3$)—, —C($CH_3$)=N—, —N=N—, or, —C≡C—, where $R^{21}$ represents a hydrogen atom or a C1-C6 alkyl group;

$A^1$, $A^2$, $B^1$ and $B^2$ each independently represent a cyclic aliphatic group which may have a substituent, or an aromatic group which may have a substituent;

$Y^1$ to $Y^4$ each independently represent a single bond, —O—, —C(=O)—, —C(=O)—O—, —O—C(=O)—, —$NR^{22}$—C(=O)—, —C(=O)—$NR^{22}$—, —O—C(=O)—O—, —$NR^{22}$—C(=O)—O—, —O—C(=O)—$NR^{22}$—, or —$NR^{22}$—C(=O)—$NR^{23}$—, where $R^{22}$ and $R^{23}$ each independently represent a hydrogen atom or a C1-C6 alkyl group;

$G^1$ and $G^2$ each independently represent an organic group which is either a C1-C20 aliphatic hydrocarbon group or a C3-C20 aliphatic hydrocarbon group in which one or more methylene groups (—$CH_2$—) are replaced by —O— or —C(=O)—, where one or more hydrogen atoms of the organic group may be replaced by a C1-C5 alkyl group, a C1-C5 alkoxy group or a halogen atom, with the proviso that methylene groups (—$CH_2$—) at both ends of each of $G^1$ and $G^2$ are not replaced by —O— or —C(=O)—;

$P^1$ and $P^2$ each independently represent a polymerizable group; and p and q each independently represent 0 or 1.

[3] A polymerizable liquid crystal composition comprising the polymerizable liquid crystal material of [1] or [2] described above, and an organic solvent.

[4] The polymerizable liquid crystal composition of [3] described above, further comprising at least one of a surfactant and a polymerization initiator.

[5] A polymer obtainable by polymerizing the polymerizable liquid crystal material of [1] or [2] described above.

[6] An optical film comprising the polymer of [5] described above as a constituent material.

[7] An optically anisotropic body comprising the polymer of [5] described above as a constituent material.

[8] A polarizing plate comprising the optically anisotropic body of [7] described above and a polarizing film.

[9] A display device comprising the polarizing plate of [8] described above.

[10] An anti-reflection film comprising the polarizing plate of [8] described above.

[11]. A method of producing a polymerizable liquid crystal composition, comprising:

a first step of confirming that a polymerizable liquid crystal material which comprises a polymerizable liquid crystal compound comprises less than 0.01 parts by mass of a salt represented by the following formula (I) per 100 parts by mass of the polymerizable liquid crystal compound, and 0.01 parts by mass or less of a nitrogen-containing compound represented by the following formula (II) per 100 parts by mass of the polymerizable liquid crystal compound; and a second step of mixing the polymerizable liquid crystal material with an organic solvent after the first step,

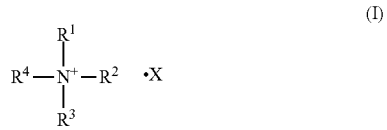

(I)

where $R^1$ to $R^4$ each independently represent a hydrogen atom or a C1-C7 alkyl group, and X represents $F^-$, $Br^-$, $HSO_4^-$, $1/2(HPO_4^{2-})$, $H_2PO_4^-$, $R-C(=O)-O^-$, $1/2(^-O-(C=O)-R'-(C=O)-O^-)$ or $R-SO_3^-$, where R represents a hydrogen atom or a monovalent hydrocarbon group, and R' represents a single bond or a divalent hydrocarbon group,

(II)

where $R^5$ represents a hydrogen atom or a C1-C7 alkyl group, and $R^6$ and $R^7$ represent a hydrogen atom.

Advantageous Effect

According to the present disclosure, it is possible to provide a polymerizable liquid crystal composition which does not easily undergo gelation (i.e., has long gelation time) and a polymerizable liquid crystal material from which the polymerizable liquid crystal composition can be prepared.

According to the present disclosure, it is also possible to provide a polymer obtainable by polymerizing the polymerizable liquid crystal material, an optical film and an optically anisotropic body which comprise the polymer, and a polarizing plate, an anti-reflection film and a display device which comprise the optically anisotropic body.

DETAILED DESCRIPTION

The present disclosure will be described in detail below. The phrase "may have a substituent" as used herein means "substituted or unsubstituted." When an organic group (e.g., alkyl group or aromatic hydrocarbon ring group) in a general formula has a substituent, the number of carbon atoms of the organic group having the substituent does not include the number of carbon atoms of that substituent. For example, when a C6-C20 aromatic hydrocarbon ring group has a substituent, the number of carbon atoms of the C6-C20 aromatic hydrocarbon ring group does not include the number of carbon atoms of the substituent. The term "alkyl group" as used herein means a chain (linear or branched) saturated hydrocarbon group and does not encompass a "cycloalkyl group," a cyclic saturated hydrocarbon group.

The disclosed polymerizable liquid crystal material and polymerizable liquid crystal composition can be used in any application, e.g., for preparing the disclosed polymer.

The disclosed polymer can be used in any application, e.g., as a constituent material of the disclosed optical film or as a constituent material of a layer of the disclosed optically anisotropic body. The disclosed optically anisotropic body can be used in any application, e.g., in the disclosed polarizing plate. The disclosed polarizing plate can be used in any application, e.g., in the disclosed display device and anti-reflection film.

The disclosed polymerizable liquid crystal composition can be produced by any method, e.g., by the disclosed method of producing a polymerizable liquid crystal composition.

1) Polymerizable Liquid Crystal Material

The disclosed polymerizable liquid crystal material comprises a polymerizable liquid crystal compound and optionally further comprises impurities incorporated for example during the preparation of the polymerizable liquid crystal compound. In the disclosed polymerizable liquid crystal material, the amount of a salt represented by formula (I) shown below is 0 part by mass or more and less than 0.01 parts by mass per 100 parts by mass of the polymerizable liquid crystal compound, and the amount of a nitrogen-containing compound represented by formula (II) shown below is 0 part by mass or more and 0.01 parts by mass or less per 100 parts by mass of the polymerizable liquid crystal compound.

In the present disclosure, "the amount of a salt represented by formula (I)" and "the amount of a nitrogen-containing compound represented by formula (II)" can be measured by ion chromatography. Specifically, "the amount of a salt represented by formula (I)" and "the amount of a nitrogen-containing compound represented by formula (II)" can be measured for example in accordance with the measurement method described in Examples described later. When more than one type of a salt represented by formula (I) is included, "the amount of a salt represented by formula (I)" refers to the total amount of a salt represented by formula (I). When more than one type of a nitrogen-containing compound represented by formula (II) is included, "the amount of a nitrogen-containing compound represented by formula (II)" refers to the total amount of a nitrogen-containing compound represented by formula (II).

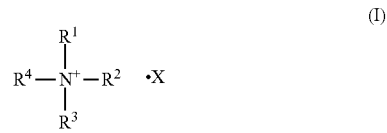

(I)

where $R^1$ to $R^4$ each independently represent a hydrogen atom or a C1-C7 alkyl group, and X represents $F^-$, $Br^-$, $Cl^-$, I⁻, $HSO_4^-$, $1/2(HPO_4^{2-})$, $H_2PO_4^-$, R—C(=O)—O⁻, $1/2($⁻O—(C=O)—R'—(C=O)—O⁻) or R—$SO_3^-$, where R represents a hydrogen atom or a monovalent hydrocarbon group, and R' represents a single bond or a divalent hydrocarbon group.

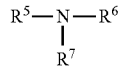

(II)

where $R^5$ represents a hydrogen atom or a C1-C7 alkyl group, and $R^6$ and $R^7$ represent a hydrogen atom.

The disclosed polymerizable liquid crystal material is based on the new findings that impurities incorporated for example during the preparation of a polymerizable liquid crystal compound contained in a polymerizable liquid crystal composition affects the gelation of the polymerizable liquid crystal composition, and that among possible various impurities incorporated for example during the preparation of the polymerizable liquid crystal compound, the salt represented by formula (I) and the nitrogen-containing compound represented by formula (II) particularly affect the gelation. Because the disclosed polymerizable liquid crystal material comprises the salt represented by formula (I) and the nitrogen-containing compound represented by formula (II) in amounts that fall within the respective ranges described above, it does not easily cause gelation compared to other polymerizable liquid crystal materials whose amounts of the salt represented by formula (I) and the nitrogen-containing compound represented by formula (II) fall outside the respective ranges described above. Accordingly, the use of the disclosed polymerizable liquid crystal material provides a polymerizable liquid crystal composition which has long gelation time and can be stored for a long time.

(1-1) Polymerizable Liquid Crystal Compound

The polymerizable liquid crystal compound is not limited to a particularly type and any polymerizable liquid crystal compound can be used that may be used to prepare a polymer used as a constituent material of optical films and optically anisotropic bodies (hereinafter also collectively referred to as "optical films etc."). A preferred polymerizable liquid crystal compound is one also referred to as a "polymerizable liquid crystal compound having reverse wavelength dispersion" which can be used to prepare a polymer to be used as a constituent material of optical films etc. having reverse wavelength dispersion.

The polymerizable liquid crystal compound described above is not limited to a particular type and examples thereof include compounds having a polymerizable group at both ends, such as that represented by the following Formula (III):

(III)

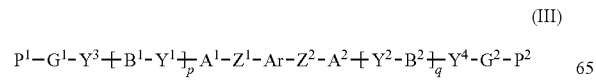

In formula (III), Ar represents a group represented by any of the following Formulas (1) to (7) which may have a substituent:

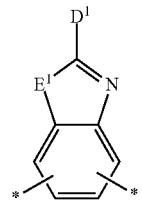

(1)

(2)

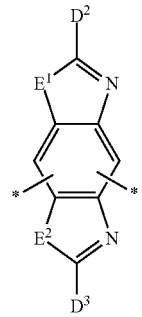

(3)

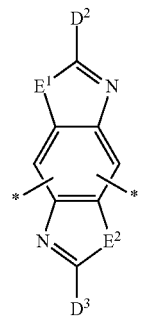

(4)

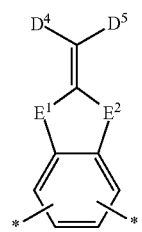

(5)

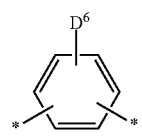

(6)

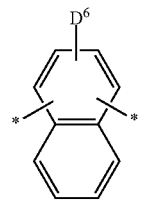

-continued

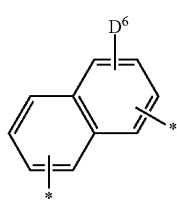

(7)

In formulas (1) to (7), *represents a bond with $Z^1$ or $Z^2$.

In formulas (1) to (4), $E^1$ represents —$CR^{11}R^{12}$—, —S—, —$NR^{11}$—, —C(=O)—, or —O—. In formulas (2) to (4), $E^2$ represents —$CR^{11}R^{12}$—, —S—, —$NR^{11}$—, —C(=O)—, or —O—. $R^{11}$ and $R^{12}$ each independently represent a hydrogen atom or a C1-C4 alkyl group. Preferably, $E^1$ and $E^2$ each independently represent —S—.

In formula (1), $D^1$ represents an aromatic hydrocarbon ring group which may have a substituent, or an aromatic heterocyclic group which may have a substituent. In formulas (2) and (3), $D^2$ and $D^3$ each independently represent an aromatic hydrocarbon ring group which may have a substituent, or an aromatic heterocyclic group which may have a substituent. In formula (4), $D^4$ and $D^5$ each independently represent an acyclic group which may have a substituent, or an organic group in which $D^4$ and $D^5$ are combined to form a ring. In formulas (5) to (7), $D^6$ represents —C($R^f$)=N—N($R^g$)$R^h$, —C($R^f$)=N—N=C($R^g$)$R^h$, or —C($R^f$)=N—N=$R^i$. $R^f$ represents a hydrogen atom or a C1-C6 alkyl group, $R^g$ represents a hydrogen atom or a C1-C30 organic group which may have a substituent, $R^h$ represents an organic group having one or more aromatic rings selected from the group consisting of a C6-C30 aromatic hydrocarbon ring and a C2-C30 aromatic heterocyclic ring, and $R^i$ represents an organic group having one or more aromatic rings selected from the group consisting of a C6-C30 aromatic hydrocarbon ring and a C2-C30 aromatic heterocyclic ring.

The term "aromatic ring" as used herein means a cyclic structure that has aromaticity in a broad sense following the Huckel's rule, i.e., a cyclic conjugated structure having (4n+2) π electrons, as well as a cyclic structure that exhibits aromaticity due to involvement of a lone electron pair of a hetero atom such as sulfur, oxygen or nitrogen with the π electron system, as represented by the cyclic structure of thiophene, furan, benzothiazole or the like.

Examples of possible substituents on the groups represented by formulas (1) to (7) shown above include halogen atoms, cyano group, nitro group, C1-C6 alkyl group, C1-C6 halogenated alkyl group, C1-C6 N-alkylamino group, C2-C12 N,N-dialkylamino group, C1-C6 alkoxy group, C1-C6 alkylsulfinyl group, carboxyl group, C1-C6 thioalkyl group, C1-C6 N-alkylsulfamoyl group, and C2-C12 N,N-dialkylsulfamoyl group.

When each of the groups represented by formulas (1) to (7) has more than one substituent, each substituent may be the same or different.

Preferred aromatic hydrocarbon rings for $D^1$ to $D^3$ are C6-C30 aromatic hydrocarbon ring groups such as phenyl group and naphthyl group, with phenyl group being more preferred.

Preferred aromatic heterocyclic groups for $D^1$ to $D^3$ are C2-C30 aromatic heterocyclic groups such as 1-benzofuranyl group, 2-benzofuranyl group, imidazolyl group, indolinyl group, furazanyl group, oxazolyl group, quinolyl group, thiadiazolyl group, thiazolyl group, thiazolopyrazinyl group, thiazolopyridyl group, thiazolopyridazinyl group, thiazolopyrimidinyl group, thienyl group, triazinyl group, triazolyl group, naphthyridinyl group, pyrazinyl group, pyrazolyl group, pyranyl group, pyridyl group, pyridazinyl group, pyrimidinyl group, pyrrolyl group, phthalazinyl group, furanyl group, phthalimide group, benzo[c]thienyl group, benzo[b]thienyl group, benzisoxazolyl group, benzisothiazolyl group, benzimidazolyl group, benzoxadiazolyl group, benzoxazolyl group, benzothiadiazolyl group, benzothiazolyl group, benzotriazinyl group, benzotriazolyl group, and benzopyrazolyl group. More preferred are monocyclic aromatic heterocyclic groups such as furanyl group, pyranyl group, thienyl group, oxazolyl group, furazanyl group, thiazolyl group, and thiadiazolyl group, and condensed aromatic heterocyclic groups such as benzothiazolyl group, benzoxazolyl group, quinolyl group, 1-benzofuranyl group, 2-benzofuranyl group, phthalimide group, benzo[c]thienyl group, benzo[b]thienyl group, thiazolopyridyl group, thiazolopyrazinyl group, benzoisoxazolyl group, benzoxiadiazolyl group, and benzothiadiazolyl group.

Examples of possible substituents on the aromatic hydrocarbon ring groups and aromatic heterocyclic groups for $D^1$ to $D^3$ include halogen atoms such as fluorine and chlorine; cyano group; C1-C6 alkyl group such as methyl group, ethyl group and propyl group; C2-C6 alkenyl group such as vinyl group and allyl group; C1-C6 halogenated alkyl group such as trifluoromethyl group; C1-C12 N,N-dialkylamino group such as dimethylamino group; C1-C6 alkoxy group such as methoxy group, ethoxy group, and isopropoxy group; nitro group; —$OCF_3$; —C(=O)—$R^b$; —O—C(=O)—$R^b$; —C(=O)—O—$R^b$; and —$SO_2R^a$. $R^a$ represents a C1-C6 alkyl group, or a C6-C20 aromatic hydrocarbon ring group which may have a C1-C6 alkyl group or a C1-C6 alkoxy group as a substituent. $R^b$ represents a C1-C20 alkyl group which may have a substituent, a C2-C20 alkenyl group which may have a substituent, a C3-C12 cycloalkyl group which may have a substituent, or a C6-C20 aromatic hydrocarbon ring group which may have a substituent.

The aromatic hydrocarbon ring groups and aromatic heterocyclic groups for $D^1$ to $D^3$ may have either one or more than one substituent per ring. When one ring has more than one substituent, each substituent may be the same or different.

Examples of the C1-C20 alkyl group for $R^b$ include methyl group, ethyl group, n-propyl group, isopropyl group, n-butyl group, isobutyl group, 1-methylpentyl group, 1-ethylpentyl group, sec-butyl group, t-butyl group, n-pentyl group, isopentyl group, neopentyl group, n-hexyl group, isohexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, and n-icosyl group. Preferably, the alkyl group for $R^b$ has 1 to 12 carbon atoms, and more preferably 4 to 10 carbon atoms.

Examples of possible substituents on the C1-C20 alkyl group for $R^b$ include halogen atoms such as fluorine and chlorine; cyano group; C2-C12 N,N-dialkylamino group such as dimethylamino group; C1-C20 alkoxy group such as methoxy group, ethoxy group, isopropoxy group, and butoxy group; C1-C12 alkoxy group substituted with a C1-C12 alkoxy group, such as methoxymethoxy group and methoxyethoxy group; nitro group; C6-C20 aromatic hydrocarbon ring group such as phenyl group and naphthyl group; C2-C20 aromatic heterocyclic group such as triazolyl group, pyrrolyl group, furanyl group, thienyl group, thiazolyl group, and benzothiazol-2-ylthio group; C3-C8 cycloalkyl group such as cyclopropyl group, cyclopentyl group, and cyclohexyl group; C3-C8 cycloalkyloxy group such as cyclopentyloxy group and cyclohexyloxy group; C2-C12 cyclic ether group such as tetrahydrofuranyl group, tetrahydropyranyl group, dioxolanyl group, and dioxanyl group; C6-C14 aryloxy group such as phenoxy group and naphthoxy group; C1-C12 fluoroalkyl group in which one or more hydrogen atoms are replaced by a fluorine atom, such as trifluoromethyl group, pentafluoroethyl group, and —CH$_2$CF$_3$; benzofuryl group; benzopyranyl group; benzodioxolyl group; and benzodioxanyl group. Preferred substituents are halogen atoms such as fluorine and chlorine; cyano group; C1-C20 alkoxy group such as methoxy group, ethoxy group, isopropoxy group, and butoxy group; nitro group; C6-C20 aromatic hydrocarbon ring group such as phenyl group and naphthyl group; C2-C20 aromatic heterocyclic group such as furanyl group, thienyl group, and thiazolyl group; C3-C8 cycloalkyl group such as cyclopropyl group, cyclopentyl group, and cyclohexyl group; and C1-C12 fluoroalkyl group in which one or more hydrogen atoms are replaced by a fluorine atom, such as trifluoromethyl group, pentafluoroethyl group, and —CH$_2$CF$_3$.

The C1-C20 alkyl group for $R^b$ may have either one or more than one substituent. When the C1-C20 alkyl group has more than one substituent, each substituent may be the same or different.

Examples of the C2-C20 alkenyl group for $R^b$ include vinyl group, propenyl group, isopropenyl group, butenyl group, isobutenyl group, pentenyl group, hexenyl group, heptenyl group, octenyl group, decenyl group, undecenyl group, dodecenyl group, tridecenyl group, tetradecenyl group, pentadecenyl group, hexadecenyl group, heptadecenyl group, octadecenyl group, nonadecenyl group, and icocenyl group. Preferably, the C2-C20 alkenyl group for $R^b$ has 2 to 12 carbon atoms.

Examples of possible substituents on the C2-C20 alkenyl group for $R^b$ are the same as those listed above as possible substituents on the C1-C20 alkyl group for $R^b$.

The C2-C20 alkenyl group for $R^b$ may have either one or more than one substituent. When the C2-C20 alkenyl group has more than one substituent, each substituent may be the same or different.

Examples of the C3-C12 cycloalkyl group for $R^b$ include cyclopropyl group, cyclobutyl group, cyclopentyl group, cyclohexyl group, and cyclooctyl group. Preferred are cyclopentyl group and cyclohexyl group.

Examples of possible substituents on the C3-C12 cycloalkyl group for $R^b$ include halogen atoms such as fluorine and chlorine; cyano group; C2-C12 N,N-dialkylamino group such as dimethylamino group; C1-C6 alkyl group such as methyl group, ethyl group, and propyl group; C1-C6 alkoxy group such as methoxy group, ethoxy group, and isopropoxy group; nitro group; and C6-C20 aromatic hydrocarbon ring group such as phenyl group and naphthyl group. Preferred substituents are halogen atoms such as fluorine and chlorine; cyano group; C1-C6 alkyl group such as methyl group, ethyl group, and propyl group; C1-C6 alkoxy group such as methoxy group, ethoxy group, and isopropoxy group; nitro group; and C6-C20 aromatic hydrocarbon ring group such as phenyl group and naphthyl group.

The C3-C12 cycloalkyl group for $R^b$ may have either one or more than one substituent. When the C3-C12 cycloalkyl group has more than one substituent, each substituent may be the same or different.

Examples of the C6-C12 aromatic hydrocarbon ring group for $R^b$ include phenyl group, 1-naphthyl group, and 2-naphthyl group, with phenyl group being preferred.

Examples of possible substituents on the C6-C12 aromatic hydrocarbon ring group for $R^b$ include halogen atoms such as fluorine and chlorine; cyano group; C2-C12 N,N-dialkylamino group such as dimethylamino group; C1-C20 alkoxy group such as methoxy group, ethoxy group, isopropoxy group, and butoxy group; C1-C12 alkoxy group substituted with a C1-C12 alkoxy group, such as methoxymethoxy group and methoxyethoxy group; nitro group; C2-C20 aromatic heterocyclic group such as triazolyl group, pyrrolyl group, furanyl group, and thiophenyl group; C3-C8 cycloalkyl group such as cyclopropyl group, cyclopentyl group, and cyclohexyl group; C3-C8 cycloalkyloxy group such as cyclopentyloxy group and cyclohexyloxy group; C2-C12 cyclic ether group such as tetrahydrofuranyl group, tetrahydropyranyl group, dioxolanyl group, and dioxanyl group; C6-C14 aryloxy group such as phenoxy group and naphthoxy group; C1-C12 fluoroalkyl group in which one or more hydrogen atoms are replaced by a fluorine atom, such as trifluoromethyl group, pentafluoroethyl group, and —CH$_2$CF$_3$; —OCF$_3$; benzofuryl group; benzopyranyl group; benzodioxolyl group; and benzodioxanyl group. Preferred are one or more substituents selected from halogen atoms such as fluorine and chlorine; cyano group; C1-C20 alkoxy group such as methoxy group, ethoxy group, isopropoxy group, and butoxy group; nitro group; C2-C20 aromatic heterocyclic group such as furanyl group and thiophenyl group; C3-C8 cycloalkyl group such as cyclopropyl group, cyclopentyl group, and cyclohexyl group; C1-C12 fluoroalkyl group in which one or more hydrogen atoms are replaced by a fluorine atom, such as trifluoromethyl group, pentafluoroethyl group, and —CH$_2$CF$_3$; and —OCF$_3$.

The C6-C12 aromatic hydrocarbon ring group for $R^b$ may have either one or more than one substituent. When the C6-C12 aromatic hydrocarbon ring group has more than one substituent, each substituent may be the same or different.

Preferred examples of the acyclic group for $D^4$ and $D^5$ include C1-C13 acyclic groups such as C1-C6 alkyl group, cyano group, carboxyl group, C1-C6 fluoroalkyl group, C1-C6 alkoxy group, —C(=O)—CH$_3$, —C(=O)NHPh, and —C(=O)—OR$^X$. More preferred examples thereof include cyano group, carboxyl group, —C(=O)—CH$_3$, —C(=O)NHPh, —C(=O)—OC$_2$H$_5$, —C(=O)—OC$_4$H$_9$, —C(=O)—OCH(CH$_3$)$_2$, —C(=O)—OCH$_2$CH$_2$CH(CH$_3$)—OCH$_3$, —C(=O)—OCH$_2$CH$_2$C(CH$_3$)$_2$—OH, and —C(=O)—OCH$_2$CH(CH$_2$CH$_3$)—C$_4$H$_9$, where $R^X$ is a C1-C12 organic group and specific examples thereof are C1-C12 alkoxy group, or C1-C12 alkyl group which may be substituted with a hydroxyl group.

Examples of possible substituents on the acyclic group for $D^4$ and $D^5$ are the same as those listed above as possible substituents on the aromatic hydrocarbon ring group and aromatic heterocyclic group for $D^1$ to $D^3$.

The acyclic group for $D^4$ and $D^5$ may have either one or more than one substituent. When the acyclic group has more than one substituent, each substituent may be the same or different.

Specific examples of the organic group in which $D^4$ and $D^5$ are combined to form a ring include the following:

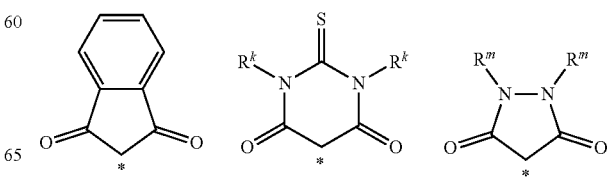

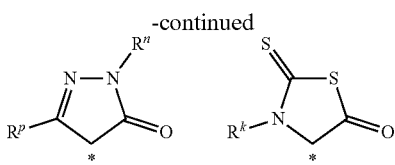

where *represents the position of the carbon atom to which D4 and D5 are bound (i.e., the carbon atom forming a ring with $D^4$ and $D^5$) in formula (4), $R^k$ represents a C1-C3 alkyl group, $R^m$ represents a C1-C3 alkyl group, or phenyl group which may have a substituent, $R^n$ represents a C1-C3 alkyl group, or phenyl group which may have a substituent, and $R^p$ represents a hydrogen atom, C1-C3 alkyl group, hydroxyl group, or —COOR", where R" represents a C1-C3 alkyl group. Examples of possible substituents on the phenyl group for $R^m$ and $R^n$ include halogen atoms, alkyl group, alkenyl group, aryl group, heterocyclic group, hydroxyl group, carboxyl group, alkoxy group, aryloxy group, acyloxy group, cyano group, and amino group, with halogen atoms, alkyl group, cyano group, and alkoxy group being preferred. The phenyl group for $R^m$ and $R^n$ may have either one or more than one substituent. When the phenyl group has more than one substituent, each substituent may be the same or different.

Examples of the C1-C6 alkyl group for $R^f$ of $D^6$ include methyl group, ethyl group, propyl group, and isopropyl group.

Examples of the C1-C30 organic group which may have a substituent for $R^g$ of $D^6$ include C1-C20 alkyl group which may have a substituent, C2-C20 alkenyl group which may have a substituent, C2-C20 alkynyl group which may have a substituent, C3-C12 cycloalkyl group which may have a substituent, C6-C30 aromatic hydrocarbon ring group which may have a substituent, C2-C30 aromatic heterocyclic group which may have a substituent, —$SO_2R^a$, —C(=O)—$R^b$, and —CS—NH—$R^b$.

$R^a$ and $R^b$ are as described above.

Examples of the C1-C20 alkyl group for $R^g$ are the same as those listed above as examples of the C1-C20 alkyl group for $R^b$.

Examples of possible substituents on the C1-C20 alkyl group for $R^g$ include halogen atoms such as fluorine and chlorine; cyano group; C2-C12 N,N-dialkylamino group such as dimethylamino group; C1-C20 alkoxy group such as methoxy group, ethoxy group, isopropoxy group, and butoxy group; C1-C12 alkoxy group substituted with a C1-C12 alkoxy group, such as methoxymethoxy group and methoxyethoxy group; nitro group; C6-C20 aromatic hydrocarbon ring group such as phenyl group and naphthyl group; C2-C20 aromatic heterocyclic group such as triazolyl group, pyrrolyl group, furanyl group, and thiophenyl group; C3-C8 cycloalkyl group such as cyclopropyl group, cyclopentyl group, and cyclohexyl group; C3-C8 cycloalkyloxy group such as cyclopentyloxy group and cyclohexyloxy group; C2-C12 cyclic ether group such as tetrahydrofuranyl group, tetrahydropyranyl group, dioxolanyl group, and dioxanyl group; C6-C14 aryloxy group such as phenoxy group and naphthoxy group; C1-C12 fluoroalkyl group in which one or more hydrogen atoms are replaced by a fluorine atom; benzofuryl group, benzopyranyl group, benzodioxolyl group, benzodioxanyl group; —O—C(=O)—$R^{b'}$, —C(=O)—$R^{b'}$, —C(=O)—O—$R^{b'}$, —$SO_2R^a$, —$SR^{b'}$ or C1-C12 alkoxy group substituted with —$SR^{b'}$; and hydroxyl group.

Specific examples of IV are as described above.

$R^{b'}$ represents a C1-C20 alkyl group which may have a substituent, C2-C20 alkenyl group which may have a substituent, C3-C12 cycloalkyl group which may have a substituent, or C6-C12 aromatic hydrocarbon ring group which may have a substituent.

Examples of the C1-C20 alkyl group for $R^{b'}$ are the same as those listed above as examples of the C1-C20 alkyl group for $R^b$.

Examples of possible substituents on the C1-C20 alkyl group for $R^{b'}$ include halogen atoms such as fluorine and chlorine; cyano group; C2-C12 N,N-dialkylamino group such as dimethylamino group; C1-C20 alkoxy group such as methoxy group, ethoxy group, isopropoxy group, and butoxy group; C1-C12 alkoxy group substituted with a C1-C12 alkoxy group, such as methoxymethoxy group and methoxyethoxy group; nitro group; C2-C4 aromatic heterocyclic group such as triazolyl group, pyrrolyl group, furanyl group, thienyl group, and thiazolyl group; C3-C8 cycloalkyl group such as cyclopropyl group, cyclopentyl group, and cyclohexyl group; C3-C8 cycloalkyloxy group such as cyclopentyloxy group and cyclohexyloxy group; C2-C12 cyclic ether group such as tetrahydrofuranyl group, tetrahydropyranyl group, dioxolanyl group, and dioxanyl group; C6-C14 aryloxy group such as phenoxy group and naphthoxy group; C1-C12 fluoroalkyl group in which one or more hydrogen atoms are replaced by a fluorine atom, such as trifluoromethyl group, pentafluoroethyl group, and —$CH_2CF_3$; benzofuryl group; benzopyranyl group; benzodioxolyl group; and benzodioxanyl group. Preferred are halogen atoms such as fluorine and chlorine; cyano group; C1-C20 alkoxy group such as methoxy group, ethoxy group, isopropoxy group, and butoxy group; nitro group; C2-C4 aromatic heterocyclic group such as furanyl group, thienyl group, and thiazolyl group; C3-C8 cycloalkyl group such as cyclopropyl group, cyclopentyl group, and cyclohexyl group; C1-C12 fluoroalkyl group in which one or more hydrogen atoms are replaced by a fluorine atom, such as trifluoromethyl group, pentafluoroethyl group, and —$CH_2CF_3$.

The C1-C20 alkyl group for $R^{b'}$ may have either one or more than one substituent. When the C1-C20 alkyl group has more than one substituent, each substituent may be the same or different.

Examples of the C2-C20 alkenyl group for $R^{b'}$ are the same as those listed above as examples of the C2-C20 alkenyl group for $R^b$. Examples of possible substituents on the C2-C20 alkenyl group for $R^{b'}$ are the same as those listed above as possible substituents on the C1-C20 alkyl group for $R^b$.

The C2-C20 alkenyl group for $R^{b'}$ may have either one or more than one substituent. When the C2-C20 alkenyl group has more than one substituent, each substituent may be the same or different.

Examples of the C3-C12 cycloalkyl group for $R^{b'}$ are the same as those listed above as examples of the C3-C12 cycloalkyl group for $R^b$.

Examples of possible substituents on the C3-C12 cycloalkyl group for $R^{b'}$ are the same as those listed above as possible substituents on the C3-C12 cycloalkyl group for $R^b$.

The C3-C12 cycloalkyl group for $R^{b'}$ may have either one or more than one substituent. When the C3-C12 cycloalkyl group has more than one substituent, each substituent may be the same or different.

Examples of the C6-C12 aromatic hydrocarbon ring group for $R^{b'}$ are the same as those listed above as examples of the C6-C12 aromatic hydrocarbon ring group for $R^b$.

Examples of possible substituents on the C6-C12 aromatic hydrocarbon ring group for $R^{b'}$ are the same as those listed above as possible substituents on the C6-C12 aromatic hydrocarbon ring group for $R^b$.

The C6-C12 aromatic hydrocarbon ring group for $R^{b'}$ may have either one or more than one substituent. When the C6-C12 aromatic hydrocarbon ring group has more than one substituent, each substituent may be the same or different.

Examples of the C2-C20 alkenyl group for $R^g$ are the same as those listed above as examples of the C2-C20 alkenyl group for $R^b$.

Examples of possible substituents on the C2-C20 alkenyl group for $R^g$ are the same as those listed above as possible substituents on the C1-C20 alkyl group for $R^g$.

The C2-C20 alkenyl group for $R^g$ may have either one or more than one substituent. When the C2-C20 alkenyl group has more than one substituent, each substituent may be the same or different.

Examples of the C2-C20 alkynyl group for $R^g$ include ethynyl group, propynyl group, 2-propynyl (propargyl) group, butynyl group, 2-butynyl group, 3-butynyl group, pentynyl group, 2-pentynyl group, hexynyl group, 5-hexynyl group, heptynyl group, octynyl group, 2-octynyl group, nonanyl group, decanyl group, and 7-decanyl group.

Examples of possible substituents on the C2-C20 alkynyl group for $R^g$ are the same as those listed above as possible substituents on the C1-C20 alkyl group for $R^g$.

The C2-C20 alkynyl group for $R^g$ may have either one or more than one substituent. When the C2-C20 alkynyl group has more than one substituent, each substituent may be the same or different.

Examples of the C3-C12 cycloalkyl group for $R^g$ are the same as those listed above as examples of the C3-C12 cycloalkyl group for $R^b$.

Examples of possible substituents on the C3-C12 cycloalkyl group for $R^g$ are the same as those listed above as possible substituents on the C1-C20 alkyl group for $R^g$.

The C3-C12 cycloalkyl group for $R^g$ may have either one or more than one substituent. When the C3-C12 cycloalkyl group has more than one substituent, each substituent may be the same or different.

Examples of the C6-C30 aromatic hydrocarbon ring group for $R^g$ are the same as those listed above as examples of the C6-C30 aromatic hydrocarbon ring group which may serve as the aromatic hydrocarbon ring group for $D^1$ to $D^3$.

Examples of possible substituents on the C6-C30 aromatic hydrocarbon ring group for $R^g$ are the same as those listed above as possible substituents on the aromatic hydrocarbon ring group for $D^1$ to $D^3$.

The C6-C30 aromatic hydrocarbon ring group for $R^g$ may have either one or more than one substituent. When the C6-C30 aromatic hydrocarbon ring group has more than one substituent, each substituent may be the same or different.

Examples of the C2-C30 aromatic heterocyclic group for $R^g$ are the same as those listed above as examples of the C2-C30 aromatic heterocyclic group which may serve as the aromatic heterocyclic group for $D^1$ to $D^3$.

Examples of possible substituents on the C2-C30 aromatic heterocyclic group for $R^g$ are the same as those listed above as possible substituents on the aromatic heterocyclic group for $D^1$ to $D^3$.

The C2-C30 aromatic heterocyclic group for $R^g$ may have either one or more than one substituent. When the C2-C30 aromatic heterocyclic group has more than one substituent, each substituent may be the same or different.

Examples of the organic group for $R^h$ of $D^6$ which has one or more aromatic rings selected from the group consisting of a C6-C30 aromatic hydrocarbon ring and a C2-C30 aromatic heterocyclic ring include the following groups 1) to 5) which may have a substituent.

Groups 1) to 5) each may have either one or more than one substituent, and when they have more than one substituent, each substituent may be the same or different:

1) C6-C40 hydrocarbon ring group which has one or more C6-C30 aromatic hydrocarbon rings;

2) C2-C40 heterocyclic group which has one or more aromatic rings selected from the group consisting of a C6-C30 aromatic hydrocarbon ring and a C2-C30 aromatic heterocyclic ring;

3) C1-C12 alkyl group substituted with at least one of a C6-C30 aromatic hydrocarbon ring group and a C2-C30 aromatic heterocyclic group;

4) C2-C12 alkenyl group substituted with at least one of a C6-C30 aromatic hydrocarbon ring group and a C2-C30 aromatic heterocyclic group; and 5) C2-C12 alkynyl group substituted with at least one of a C6-C30 aromatic hydrocarbon ring group and a C2-C30 aromatic heterocyclic group.

Specific examples of the group 1) include the following:

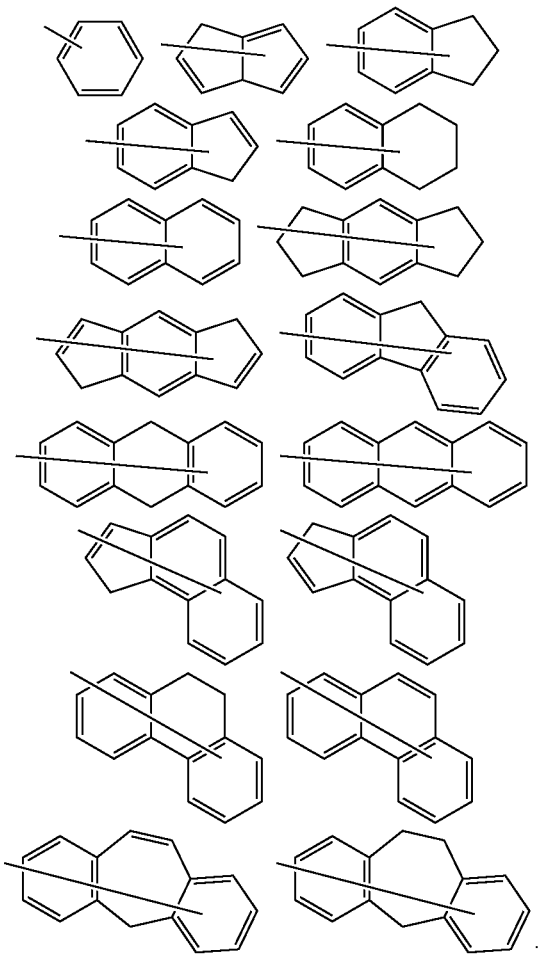

Examples of possible substituents on the 1) C6-C40 hydrocarbon ring group include halogen atoms such as fluorine and chlorine; cyano group; C1-C6 alkyl group such as methyl group, ethyl group, and propyl group; C2-C6 alkenyl group such as vinyl group and allyl group; halogenated C1-C6 alkyl group such as trifluoromethyl group; C2-C12 N,N-dialkylamino group such as dimethylamino group; C1-C6 alkoxy group such as methoxy group, ethoxy group, and isopropoxy group; nitro group; C6-C20 aromatic hydrocarbon ring group such as phenyl group and naphthyl group; —OCF$_3$; —C(=O)—R$^b$; —O—C(=O)—R$^b$; —C(=O)—O—R$^b$; and —SO$_2$R$^a$. R$^a$ and R$^b$ are as described above. Preferred are one or more substituents selected from the group consisting of halogen atoms, cyano group, C1-C6 alkyl group, and C1-C6 alkoxy group.

Specific examples of the group 2) include the following:

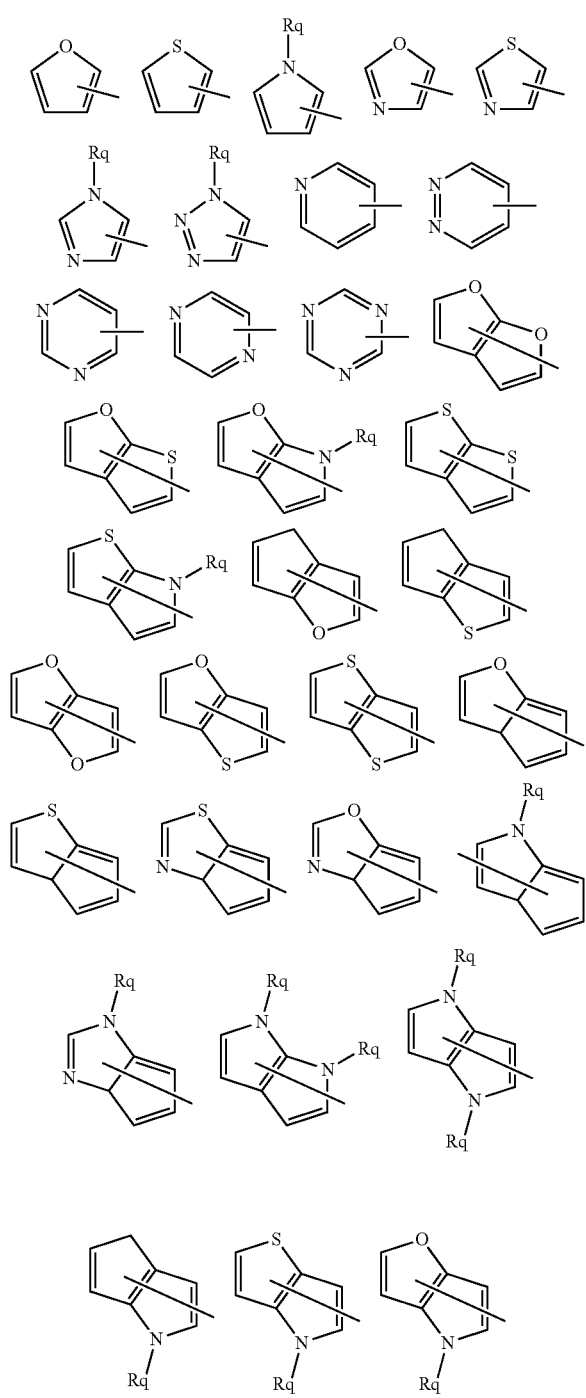

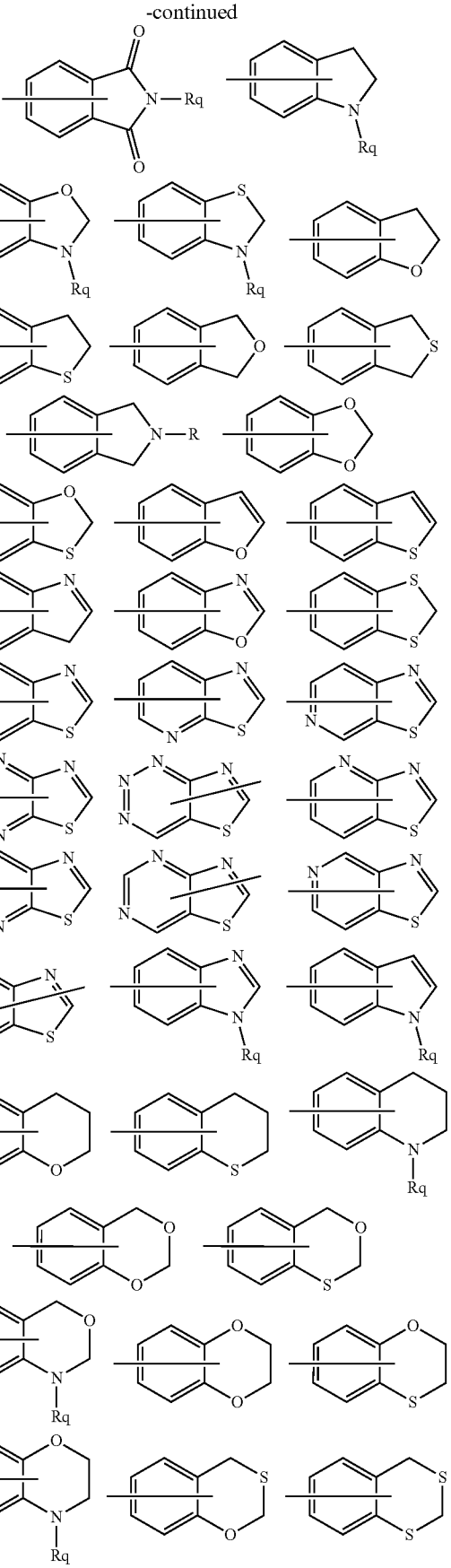

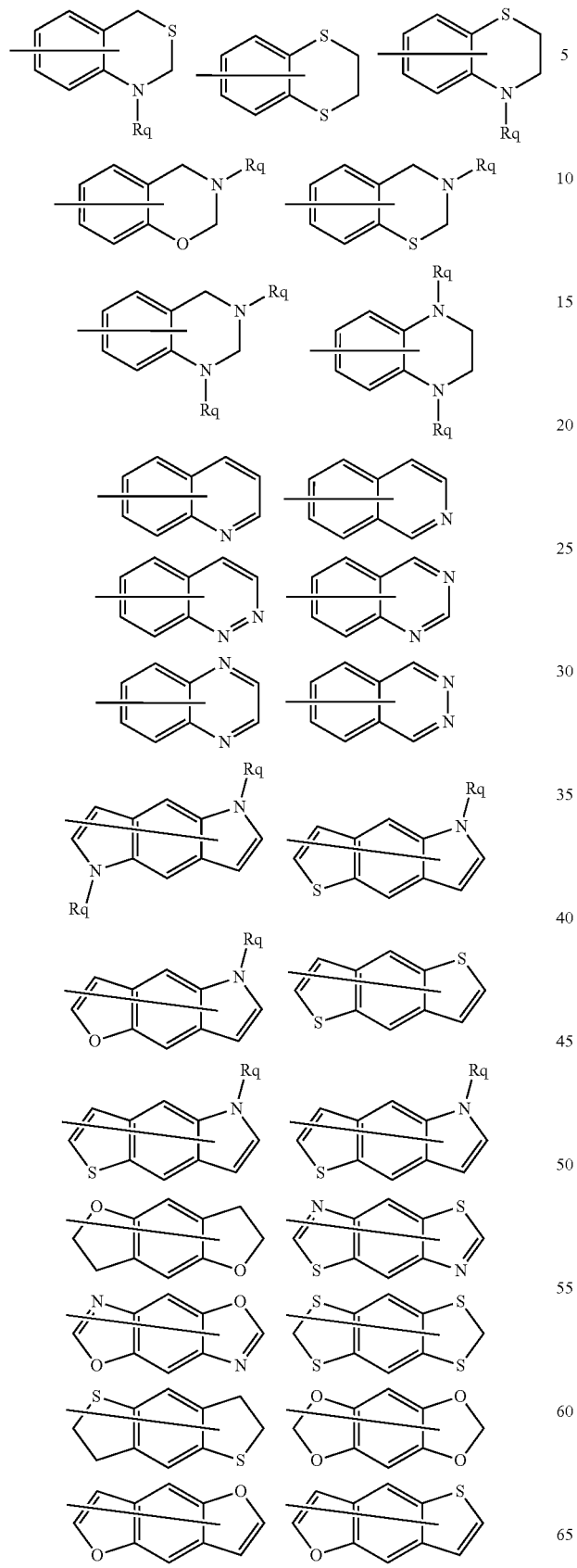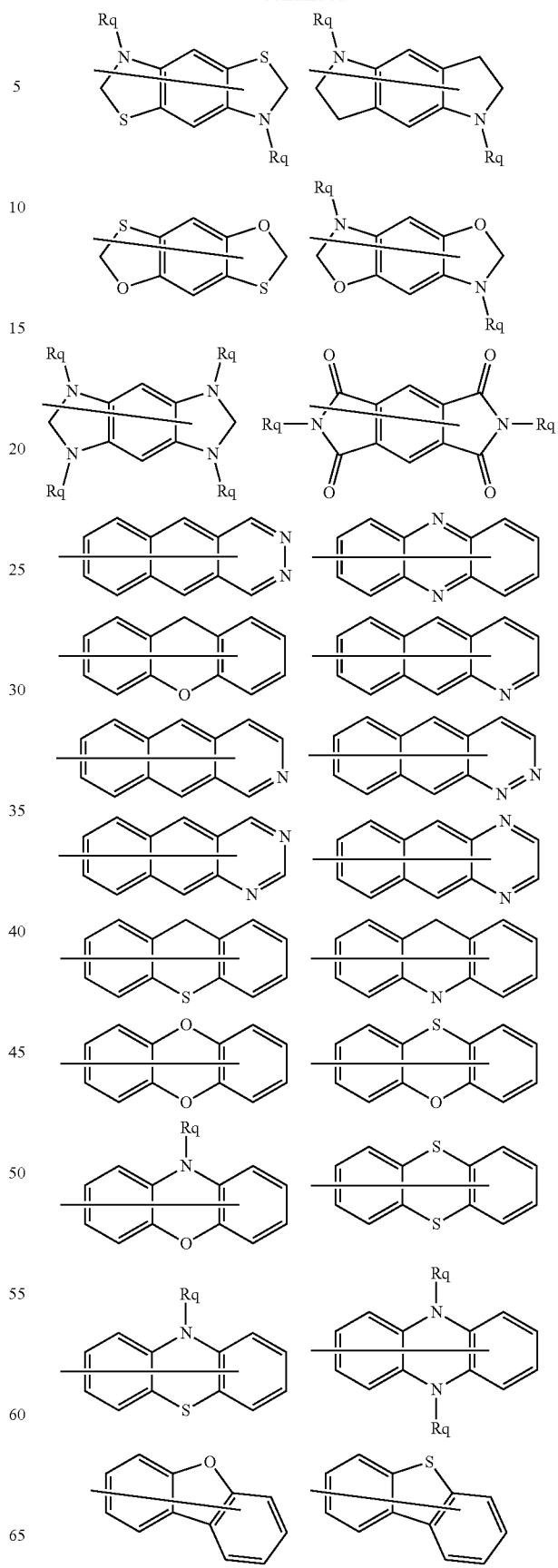

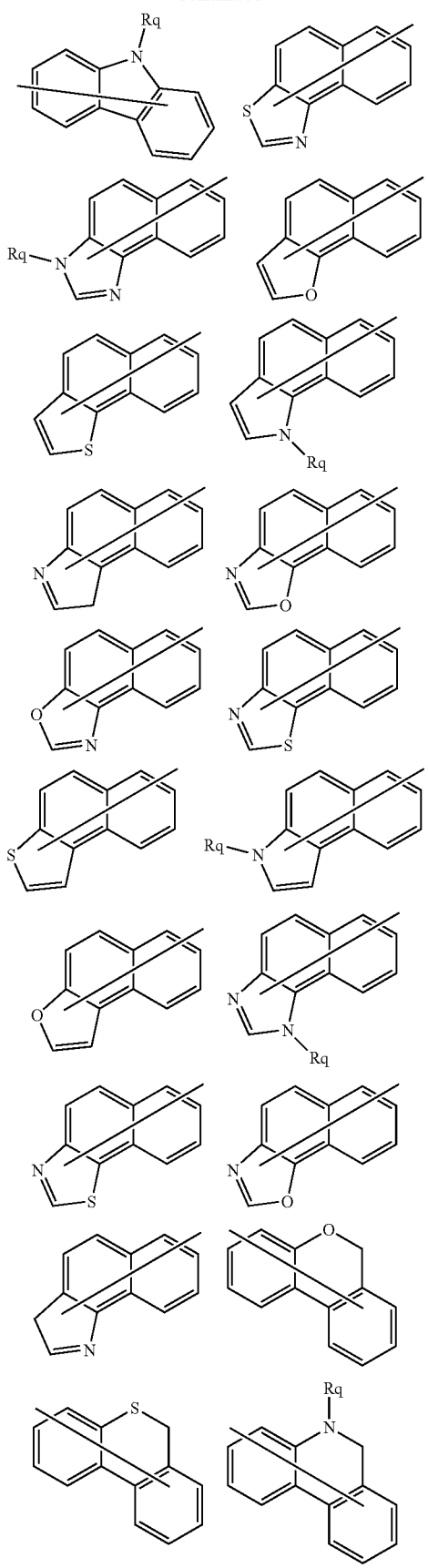
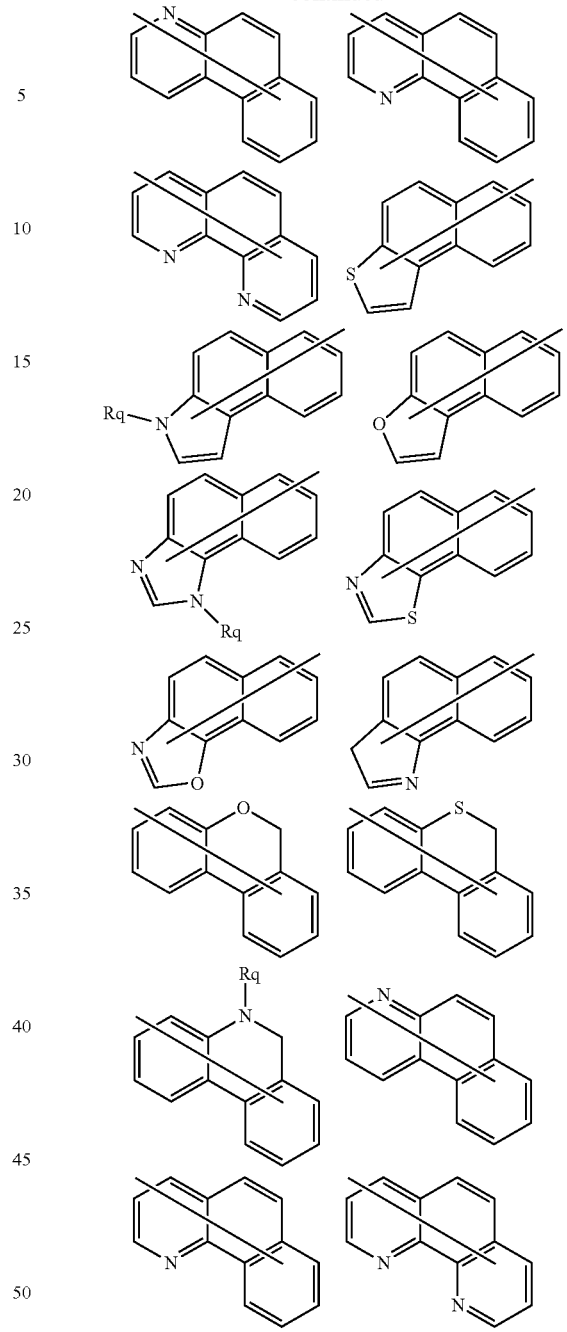

where Rq represents a hydrogen atom or a C1-C6 alkyl group, and when there are more than one Rq, they may be the same or different.

Examples of possible substituents on the 2) C2-C40 heterocyclic group are the same as those listed above as possible substituents on the 1) C6-C40 hydrocarbon ring group.

Examples of the C6-C30 aromatic hydrocarbon ring group in the groups 3) to 5) are the same as those listed above as examples of the C6-C30 aromatic hydrocarbon ring group which may serve as the aromatic hydrocarbon group for $D^1$ to $D^3$. Examples of the C2-C30 aromatic heterocyclic group in the groups 3) to 5) are the same as those listed above as examples of the C2-C30 aromatic heterocyclic group which may serve as the aromatic heterocyclic group for $D^1$ to $D^3$.

Examples of the 3) C1-C12 alkyl group include methyl group, ethyl group, propyl group, and isopropyl group. Examples of the 4) C2-C12 alkenyl group include vinyl group and allyl group. Examples of the 5) C2-C12 alkynyl group include ethynyl group and propynyl group.

Examples of possible substituents on the groups 3) to 5) are the same as those listed above as possible substituents on the 1) C6-C40 hydrocarbon ring group.

Preferably, $R^h$ represents a group represented by any of the following formulas:

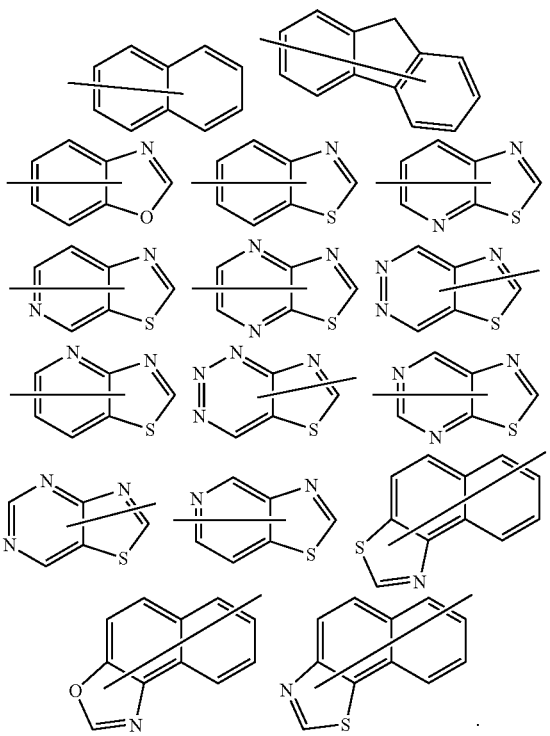

More preferably, $R^h$ represents a group represented by any of the following formulas:

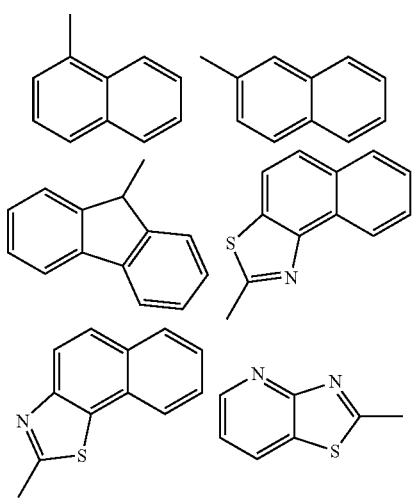

Examples of possible substituents on $R^h$ of $D^6$ include halogen atoms such as fluorine and chlorine; cyano group; C1-C6 alkyl group such as methyl group, ethyl group, and propyl group; C2-C6 alkenyl group such as vinyl group and allyl group; halogenated C1-C6 alkyl group such as trifluoromethyl group; C2-C12 N,N-dialkylamino group such as dimethylamino group; C1-C6 alkoxy group such as methoxy group, ethoxy group, and isopropoxy group; nitro group; —$OCF_3$; —C(=O)—$R^b$; —O—C(=O)—$R^b$; —C(=O)—O—$R^b$; and —$SO_2R^a$. Preferred are one or more substituents selected from the group consisting of halogen atoms, cyano group, C1-C6 alkyl group, and C1-C6 alkoxy group. IV and $R^b$ are as described above.

Examples of the organic group for $R^i$ of $D^6$ which has one or more aromatic rings selected from the group consisting of a C6-C30 aromatic hydrocarbon ring and a C2-C30 aromatic heterocyclic ring include the following groups 6) and 7) which may have a substituent:

6) C6-C40 hydrocarbon ring group which has one or more C6-C30 aromatic hydrocarbon rings; and 7) C2-C40 heterocyclic group which has one or more aromatic rings selected from the group consisting of a C6-C30 aromatic hydrocarbon ring and a C2-C30 aromatic heterocyclic ring.

Above all, $R^i$ preferably represents a group represented by any of the following formulas:

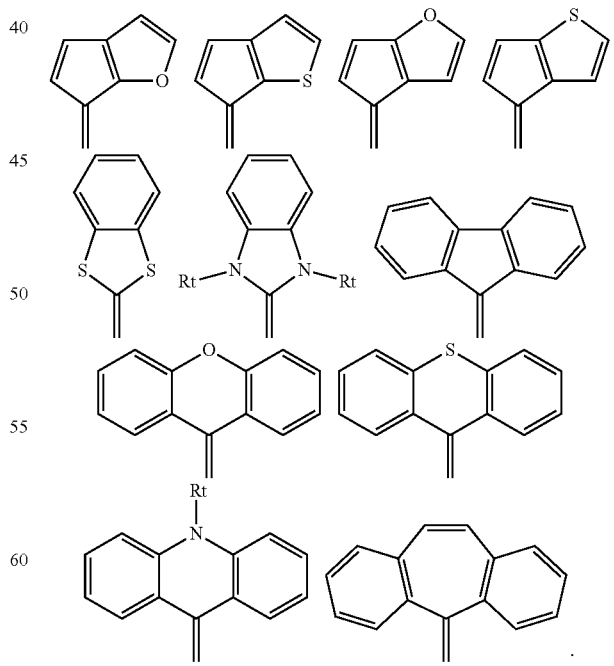

where $R^t$ represents a hydrogen atom or a C1-C6 alkyl group.

Among the foregoing, Ar preferably represents a group represented by any of the following Formulas (1-1) to (6-3), which may have a substituent:
(1-1)
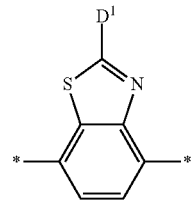
(2-1)
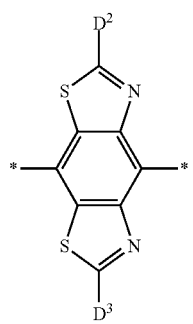
(3-1)
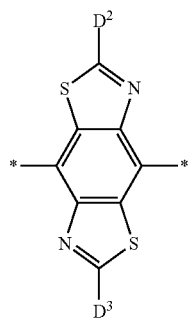
(4-1)
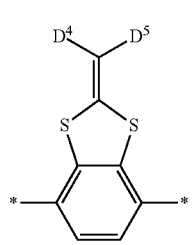
(5-1)
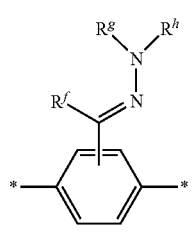
-continued
(5-2)
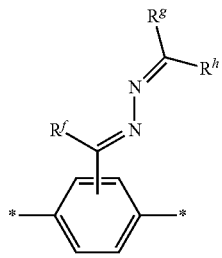
(5-3)
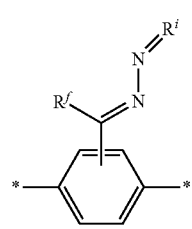
(6-1)
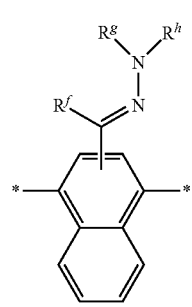
(6-2)
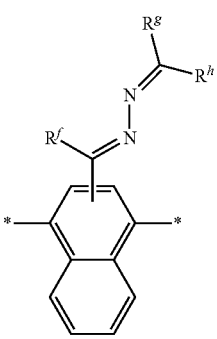
(6-3)
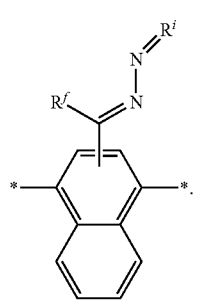

Specific examples of groups represented by formula (1-1) and (4-1) include the following:
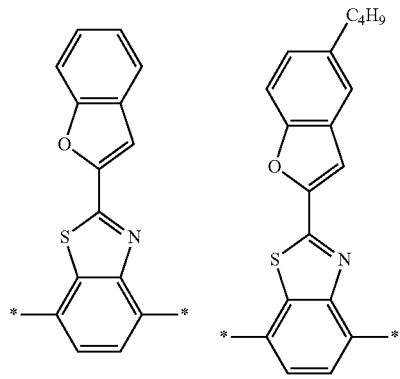
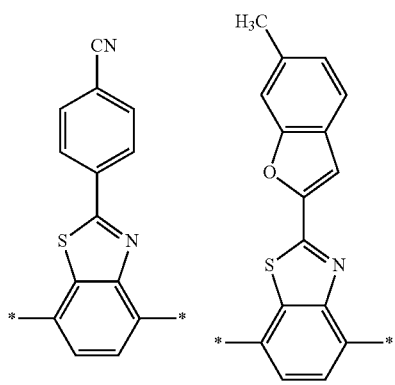
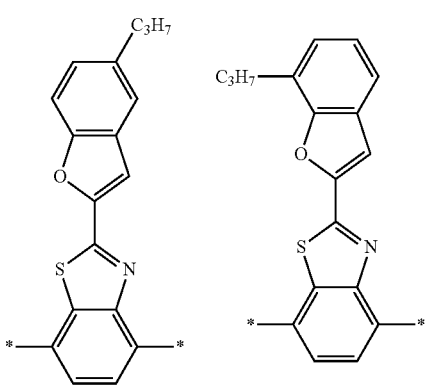
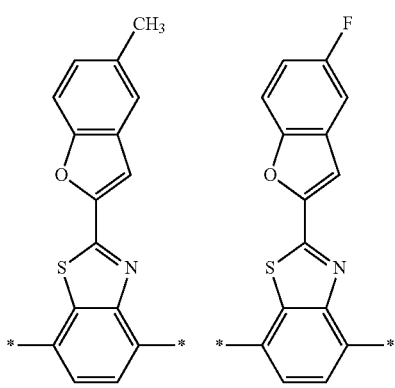
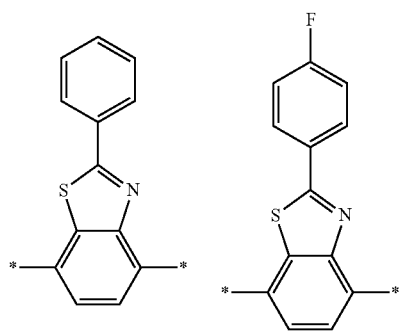
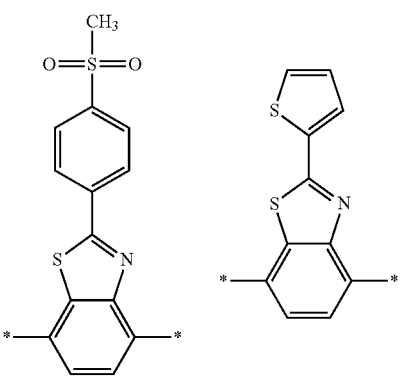
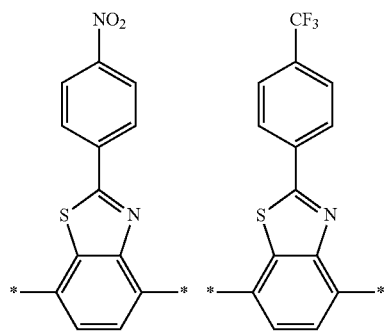
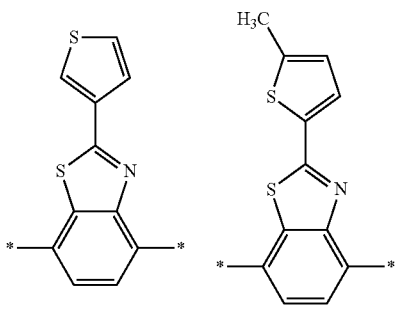

-continued
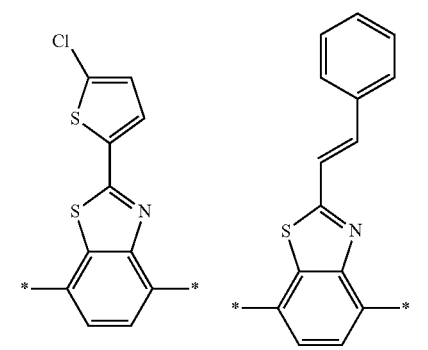
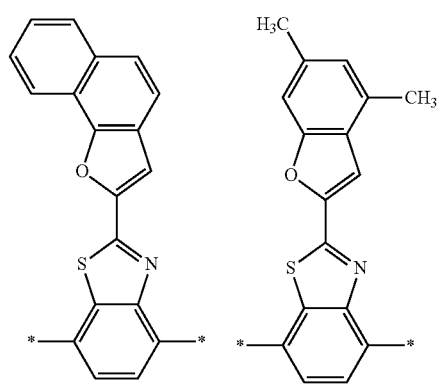
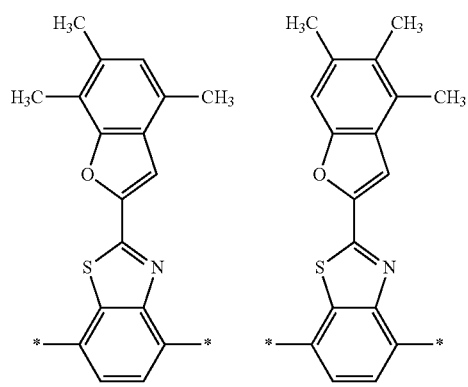
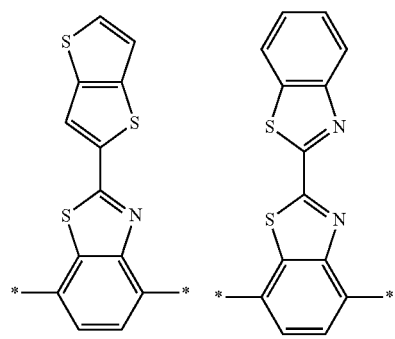
-continued
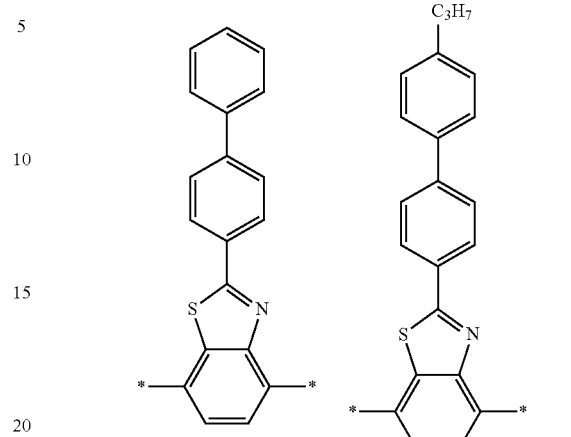
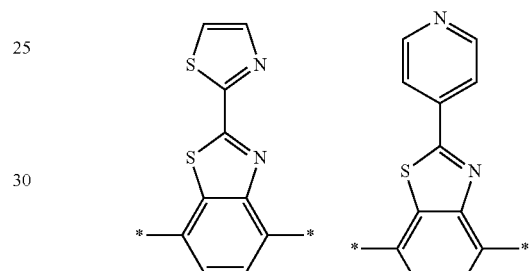
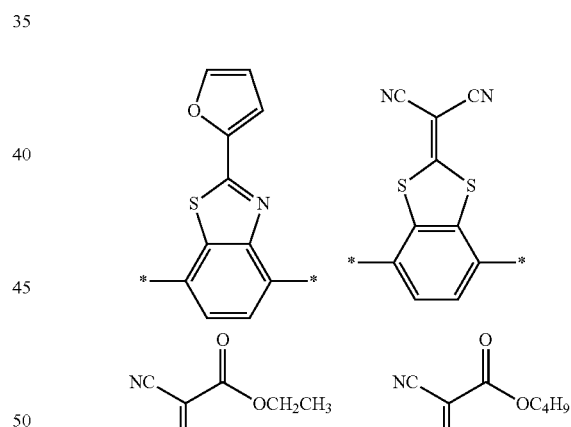
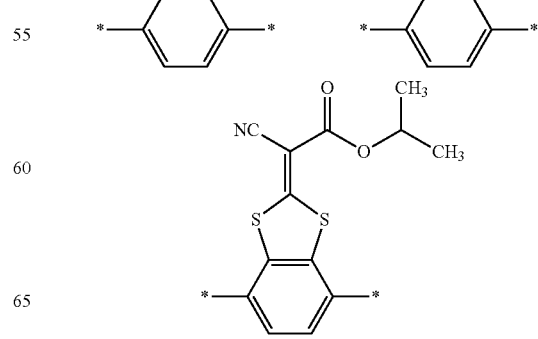

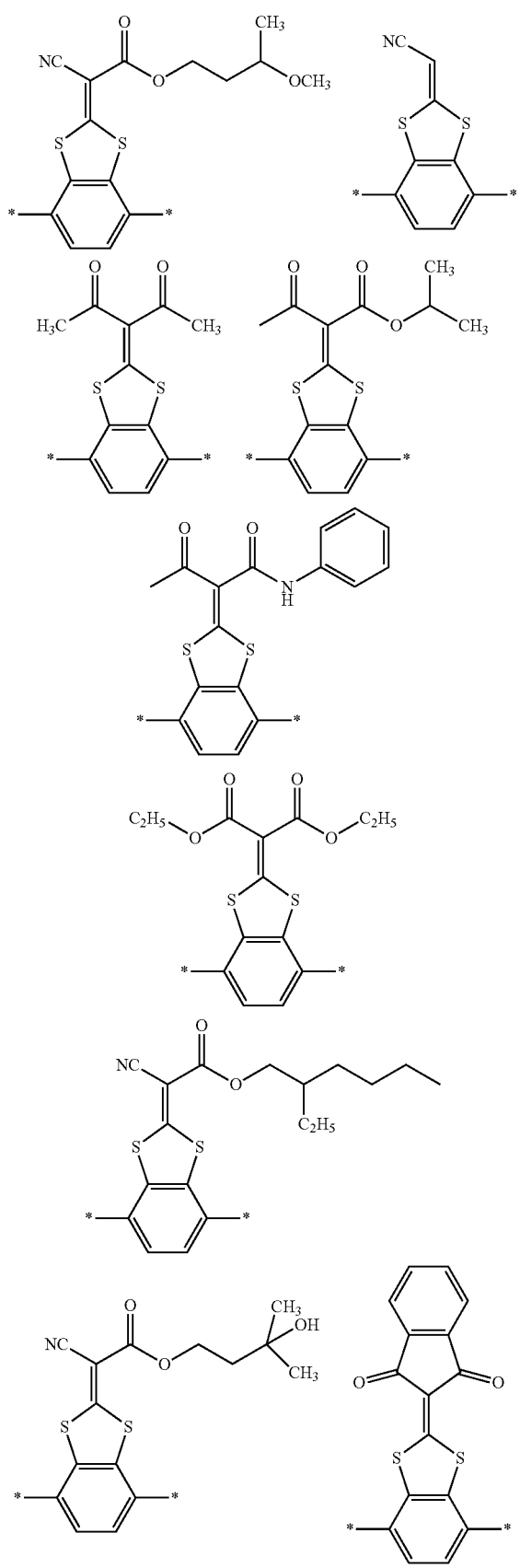
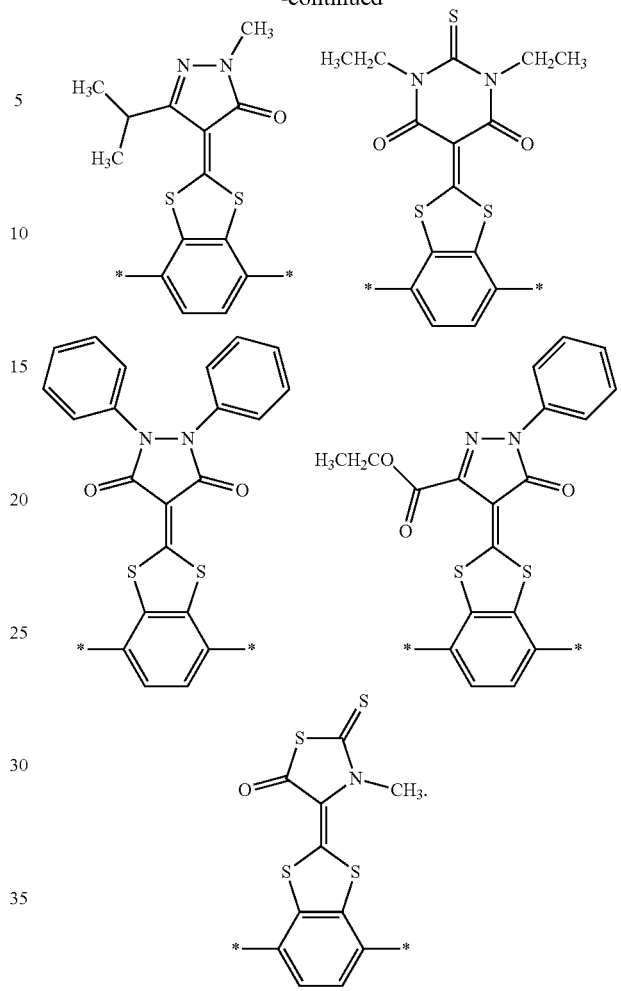

In formula (III), $Z^1$ and $Z^2$ each independently represent a single bond, —O—, —O—CH$_2$—, —CH$_2$—O—, —O—CH$_2$—CH$_2$—, —CH$_2$—CH$_2$—O—, —C(=O)—O—, —O—C(=O)—, —C(=O)—S—, —S—C(=O)—, —NR$^{21}$—C(=O)—, —C(=O)—NR$^{21}$—, —CF$_2$—O—, —O—CF$_2$—, —CH$_2$—CH$_2$—, —CF$_2$—CF$_2$—, —O—CH$_2$—CH$_2$—O—, —CH=CH—C(=O)—O—, —O—C(=O)—CH=CH—, —CH$_2$—C(=O)—O—, —O—C(=O)—CH$_2$—, —CH$_2$—O—C(=O)—, —C(=O)—O—CH$_2$—, —CH$_2$—CH$_2$—C(=O)—O—, —O—C(=O)—CH$_2$—CH$_2$—, —CH$_2$—CH$_2$—O—C(=O)—, —C(=O)—O—CH$_2$—CH$_2$—, —CH=CH—, —N=CH, —CH=N—, —N=C(CH$_3$)—, —C(CH$_3$)=N—, —N=N—, or —C≡C—, where R$^{21}$ represents a hydrogen atom or a C1-C6 alkyl group.

In formula (III), A$^1$, A$^2$, B$^1$ and B$^2$ each independently represent a cyclic aliphatic group which may have a substituent, or an aromatic group which may have a substituent. Preferably, A$^1$, A$^2$, B$^1$ and B$^2$ each independently represent a C5-C20 cyclic aliphatic group which may have a substituent, or a C2-C20 aromatic group which may have a substituent.

Specific examples of the cyclic aliphatic group for A$^1$, A$^2$, B$^1$ and B$^2$ include C5-C20 cycloalkanediyl group such as cyclopentane-1,3-diyl group, cyclohexane-1,4-diyl group, 1,4-cycloheptane-1,4-diyl group, and cyclooctane-1,5-diyl group; and C5-C20 bicycloalkanediyl group such as decahydronaphthalene-1,5-diyl group and decahydronaphthalene-2,6-diyl group. A preferred cyclic aliphatic group is a C5-C20 cycloalkanediyl group which may have a substituent, with cyclohexanediyl group being more preferred, and cyclohexane-1,4-diyl group being even more preferred. The cyclic aliphatic group may be a trans isomer, a cis isomer, or a mixture of cis and trans isomers, but is preferably a trans isomer.

Specific examples of the aromatic group for $A^1$, $A^2$, $B^1$ and $B^2$ include C6-C20 aromatic hydrocarbon ring group such as 1,2-phenylene group, 1,3-phenylene group, 1,4-phenylene group, 1,4-naphthylene group, 1,5-naphthylene group, 2,6-naphthylene group, and 4,4'-biphenylene group; and C2-C20 aromatic heterocyclic group such as furan-2,5-diyl group, thiophene-2,5-diyl group, pyridine-2,5-diyl group, and pyrazine-2,5-diyl group. A preferred aromatic group is a C6-C20 aromatic hydrocarbon ring group, with phenylene group being more preferred, and 1,4-phenylene group being even more preferred.

Examples of substituents on the cyclic aliphatic group and aromatic group for $A^1$, $A^2$, $B^1$ and $B^2$ include halogen atoms, C1-C6 alkyl group, C1-C5 alkoxy group, nitro group, and cyano group. The cyclic aliphatic group and aromatic group may have at least one substituent selected from the foregoing substituents. When the cyclic aliphatic group and aromatic group each have more than one substituent, each substituent may be the same or different.

In formula (III), $Y^1$ to $Y^4$ each independently represent a single bond, —O—, —C(=O)—, —C(=O)—O—, —O—C(=O)—, —NR$^{22}$—C(=O)—, —C(=O)—NR$^{22}$—, —O—C(=O)—O—, —NR$^{22}$—C(=O)—O—, —O—C(=O)—NR$^{22}$—, or —NR$^{22}$—C(=O)—NR$^{23}$—, where $R^{22}$ and $R^{23}$ each independently represent a hydrogen atom or a C1-C6 alkyl group.

In formula (III), $G^1$ and $G^2$ each independently represent an organic group which is either a C1-C20 aliphatic hydrocarbon group or a C3-C20 aliphatic hydrocarbon group in which one or more methylene groups (—CH$_2$—) are replaced by —O— or —C(=O)—. One or more hydrogen atoms of the organic group may be replaced by a C1-C5 alkyl group, a C1-C5 alkoxy group or a halogen atom, with the proviso that methylene groups (—CH$_2$—) at both ends of each of $G^1$ and $G^2$ are not replaced by —O— or —C(=O)—.

Specific examples of the C1-C20 aliphatic hydrocarbon group include C1-C20 alkylene group, and specific examples of the C3-C20 aliphatic hydrocarbon group include C3-C20 alkylene group.

In formula (III), p and q each independently represent 0 or 1.

In formula (III), $P^1$ and $P^2$ each independently represent a polymerizable group. Examples of polymerizable groups for $P^1$ and $P^2$ include a group represented by the formula CH$_2$=CR$^c$—C(=O)—O— (where $R^c$ represents a hydrogen atom, a methyl group or a chlorine atom), such as acryloyloxy group and methacryloyloxy group, vinyl group, vinyl ether group, p-stilbene group, acryloyl group, methacryloyl group, carboxyl group, methylcarbonyl group, hydroxyl group, amide group, C1-C4 alkylamino group, amino group, epoxy group, oxetanyl group, aldehyde group, isocyanate group, and thioisocyanate group. A preferred polymerizable group is a group represented by the formula CH$_2$=CR$^c$—C(=O)—O—, with CH$_2$=CH—C(=O)—O— (acryloyloxy group) and CH$_2$=C(CH$_3$)—C(=O)—O— (methacryloyloxy group) being preferred, and acryloyloxy group being even more preferred.

The polymerizable liquid crystal compound described above can be synthesized by combining synthesis reactions known in the art, i.e., with reference to methods described in various literatures (e.g., WO2014010325, WO2012147904, JP2010031223A, JP2008273925A, and JP2009179563A).

The ratio, in terms of solid content, of the polymerizable liquid crystal compound in the polymerizable liquid crystal material is usually 70% by mass or more and less than 100% by mass, and can be, for example, 80% by mass or more and 99% by mass or less.

(1-2) Salt

The salt represented by formula (I) is an ammonium salt wherein all of $R^1$ to $R^4$ are hydrogen atoms, an alkylamine salt wherein at least one of $R^1$ to $R^4$ is a C1-C7 alkyl group, or a mixture thereof.

A preferred C1-C7 alkyl group for $R^1$ to $R^4$ is —CH$_3$ or —(CH$_2$)$_n$CH$_3$ (where n is an integer from 1 to 6), with methyl group (—CH$_3$) or ethyl group (—CH$_2$CH$_3$) being more preferred.

X in formula (I) represents F$^-$, Br$^-$, Cl$^-$, I$^-$, HSO$_4^-$, 1/2(HPO$_4^{2-}$), H$_2$PO$_4^-$, R—C(=O)—O$^-$, 1/2($^-$O—(C=O)—R'—(C=O)—O$^-$) or R—SO$_3^-$, where R represents a hydrogen atom or a monovalent hydrocarbon group, and R' represents a single bond or a divalent hydrocarbon group.

The monovalent hydrocarbon group for R in formula (I) is not limited to a particular type and examples thereof include methyl group, phenyl group, benzyl group, orthotolyl group, metatolyl group, and paratolyl group. Preferably, the monovalent hydrocarbon group for R represents methyl group, phenyl group, or paratolyl group.

The divalent hydrocarbon group for R' in formula (I) is not limited to a particular type and examples thereof include methylene group, orthophenylene group, metaphenylene group, and paraphenylene group. Preferably, the divalent hydrocarbon group for R' represents methylene group or paraphenylene group.

Preferably, X represents F$^-$, Br$^-$ or Cl$^-$, and more preferably Br$^-$ or Cl$^-$.

Preferably, the salt represented by formula (I) is ammonium chloride, methylamine hydrochloride, ethylamine hydrochloride, dimethylamine hydrochloride, diethylamine hydrochloride, trimethylamine hydrochloride, tri ethyl amine hydrochloride, tetramethylammonium chloride, tetraethylammonium chloride, or a mixture thereof From the viewpoint of sufficiently reducing gelation, it is only necessary that the amount of the salt represented by formula (I) per 100 parts by mass of the polymerizable liquid crystal compound is 0 part by mass or more and less than 0.01 parts by mass, but is preferably 0.008 parts by mass or less, more preferably 0.003 parts by mass or less, and even more preferably below the lower limit of quantification by ICS-1500 (DIONEX ion chromatography system).

The salt represented by formula (I) may be incorporated into the polymerizable liquid crystal material due to, for example, a base used for preparing the polymerizable liquid crystal compound. The amount of the salt represented by formula (I) in the polymerizable liquid crystal material can be adjusted by purification methods known in the art, such as, for example, silica gel column chromatography for purifying the polymerizable liquid crystal compound.

From the viewpoint of reducing the burden of operations such as purification, the polymerizable liquid crystal material may comprise the salt represented by formula (I) in an amount that falls within the range described above. For example, the amount of the salt represented by formula (I)

per 100 parts by mass of the polymerizable liquid crystal compound may be 0.003 parts by mass or more.

(1-3) Nitrogen-Containing Compound

The nitrogen-containing compound represented by formula (II) is ammonia in which all of $R^5$ to $R^7$ are all hydrogen atoms, a primary alkylamine in which $R^5$ is a C1-C7 alkyl group, or a mixture thereof.

The disclosed polymerizable liquid crystal material may comprise a secondary alkylamine, a tertiary alkylamine and/or the like. The total amount of the secondary alkylamine and tertiary alkylamine in the polymerizable liquid crystal material is not limited to a particular value, but is usually 10 parts by mass or less per 100 parts by mass of the polymerizable liquid crystal compound.

A preferred C1-C7 alkyl group for $R^5$ is —$CH_3$ or —$(CH_2)_nCH_3$ (where n is an integer from 1 to 6), with methyl group (—$CH_3$) or ethyl group (—$CH_2CH_3$) being more preferred.

Among the foregoing, the nitrogen-containing compound represented by formula (II) is preferably a primary alkylamine, and more preferably methylamine or ethylamine.

From the viewpoint of sufficiently reducing gelation, it is only necessary that the amount of the nitrogen-containing compound represented by formula (II) per 100 parts by mass of the polymerizable liquid crystal compound is 0 part by mass or more and 0.01 parts by mass or less.

The nitrogen-containing compound represented by formula (II) may be incorporated into the polymerizable liquid crystal material due to, for example, a base used for preparing the polymerizable liquid crystal compound. The amount of the nitrogen-containing compound represented by formula (II) in the polymerizable liquid crystal material can be adjusted by purification methods known in the art, such as, for example, silica gel column chromatography for purifying the polymerizable liquid crystal compound.

From the viewpoint of reducing the burden of operations such as purification, the polymerizable liquid crystal material may comprise the nitrogen-containing compound represented by formula (II) in an amount that falls within the range described above. For example, the amount of the nitrogen-containing compound represented by formula (II) per 100 parts by mass of the polymerizable liquid crystal compound may be 0.003 parts by mass or more.

(1-4) Other Impurities

The polymerizable liquid crystal material may comprise other impurities in addition to the salt represented by formula (I) and the nitrogen-containing compound represented by formula (II).

(2) Polymerizable Liquid Crystal Composition

The disclosed polymerizable liquid crystal composition comprises a polymerizable liquid crystal material and an organic solvent, and optionally further comprises at least one of a surfactant and a polymerization initiator. Moreover, the polymerizable liquid crystal composition may further comprise components other than those described above.

Of note, the polymerizable liquid crystal composition is useful as a raw material for producing the disclosed polymer, optical film, and optically anisotropic body as will be described later. Because the disclosed polymerizable liquid crystal composition comprises the polymerizable liquid crystal material described above, the polymerizable liquid crystal composition has long gelation time and thus excellent storability.

(2-1) Polymerizable Liquid Crystal Material

As the polymerizable liquid crystal material, it is possible to use the polymerizable liquid crystal material described above which comprises the polymerizable liquid crystal compound.

(2-2) Organic Solvent

The organic solvent is not limited to a particular type and examples thereof include ketones such as cyclopentanone, cyclohexanone, and methyl ethyl ketone; acetates such as butyl acetate and amyl acetate; halogenated hydrocarbons such as chloroform, dichloromethane, and dichloroethane; and ethers such as 1,4-dioxane, cyclopentyl methyl ether, tetrahydrofuran, tetrahydropyran, and 1,3-dioxolane.

(2-3) Surfactant

Preferably, a surfactant is added into the polymerizable liquid crystal composition in order to modify the surface tension. The surfactant is not limited to a particular type but nonionic surfactants are generally preferred. Commercially available nonionic surfactants may be used. Examples thereof include oligomers containing a fluorine-containing group, a hydrophilic group and a lipophilic group, e.g., those available under the following trade names: Surflon series (e.g., S242, S243, S386, S420, S611, S651) manufactured by AGC Seimi Chemical Co., Ltd.; Megaface series (e.g., F251, F554, F556, F562, RS-75, RS-76-E) manufactured by DIC Corporation; and FTERGENT series (e.g., FTX601AD, FTX602A, FTX601ADH2, FTX650A) manufactured by NEOS COMPANY LIMITED. These surfactants may be used singly or in combination of two or more kinds combined at any desired ratio.

The amount of the surfactant added in the polymerizable liquid crystal composition is usually 0.01 to 10 parts by mass, more preferably 0.01 to 2 parts by mass, per 100 parts by mass of the polymerizable liquid crystal compound contained in the polymerizable liquid crystal composition.

(2-4) Polymerization Initiator

A polymerization initiator is added from the viewpoint of more efficiently effecting the polymerization reaction of the polymerizable liquid crystal compound contained in the polymerizable liquid crystal composition.

Examples of polymerization initiators used herein include radical polymerization initiators, anionic polymerization initiators, and cationic polymerization initiators.

Radical polymerization initiators usable herein are thermal radical generators which are compounds that, when heated, generate active species which may initiate polymerization of the polymerizable liquid crystal compound; and photo-radical generators which are compounds that, when exposed to visible light, ultraviolet light (i-line, etc.), deep ultraviolet light, electron beam, X-ray or other exposure light, generate active species which may initiate polymerization of the polymerizable liquid crystal compound. Suitable are photo-radical generators.

Examples of photo-radical generators include acetophenone compounds, biimidazole compounds, triazine compounds, O-acyloxime compounds, onium salt compounds, benzoin compounds, benzophenone compounds, α-diketone compounds, polynuclear quinone compounds, xanthone compounds, diazo compounds, and imide sulfonate compounds. These compounds are components that generate active radicals, active acids, or both, by exposure. Photo-radical generators may be used singly or in combination of two or more kinds.

Specific examples of acetophenone compounds include 2-hydroxy-2-methyl-1-phenylpropan-1-one, 2-methyl-1-[4-(methylthio)phenyl]-2-morpholinopropan-1-one, 2-benzyl-2-dimethylamino-1-(4-morpholinophenyl)butan-1-one, 1-hydroxycyclohexyl phenyl ketone, 2,2-dimethoxy-1,2-diphenylethane-1-one, 1,2-octanedione, and 2-benzyl-2-dimethylamino-4'-morpholinobutyrophenone.

Specific examples of biimidazole compounds include 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4',5,5'-tetraphenyl-1,2'-biimidazole, and 2,2'-bis(2,4,6)-tribromophenyl)-4,4',5,5'-tetraphenyl-1,2'-biimidazole.

When a biimidazole compound is to be used as a photopolymerization initiator (photo-radical generator) herein, it is preferred to use a hydrogen donor in combination because sensitivity can be further improved.

The term "hydrogen donator" as used herein means a compound capable of donating a hydrogen atom to a radical generated from a biimidazole compound by exposure. Examples of hydrogen donators include mercaptan compounds and amine compounds as defined below.

Specific examples of mercaptan compounds include 2-mercaptobenzothiazole, 2-mercaptobenzoxazole, 2-mercaptobenzimidazole, 2,5-dimercapto-1,3,4-thiadiazole, and 2-mercapto-2,5-dimethylaminopyridine. Specific examples of amine compounds include 4,4'-bis(dimethylamino)benzophenone, 4,4'-bis(diethylamino)benzophenone, 4-diethylaminoacetophenone, 4-dimethylaminopropiophenone, ethyl-4-dimethylaminobenzoate, 4-dimethylaminobenzoic acid, and 4-dimethylaminobenzonitrile.

Specific examples of triazine compounds include those having a halomethyl group, such as 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, and 2-(4-n-butoxyphenyl)-4,6-bis(trichloromethyl)-s-triazine.

Specific examples of 0-acyloxime compounds include 1-[4-(phenylthio)phenyl]-heptane-1,2-dione-2-(O-benzoyloxime), 1-[4-(phenylthio)phenyl]-octane-1,2-dione-2-(O-benzoyloxime), 1-[4-(benzoyl)phenyl]-octane-1,2-dione-2-(O-benzoyloxime), 1-[9-ethyl-6-(2-methylbenzoyl)-9H-carbazole-3-yl]-ethanone-1-(O-acetyloxime), 1-[9-ethyl-6-(3-methylbenzoyl)-9H-carbazol-3-yl]-ethanone-1-(O-acetyloxime), 1-(9-ethyl-6-benzoyl-9H-carbazol-3-yl)-ethanone-1-(O-acetyloxime), ethanone-1-[9-ethyl-6-(2-methyl-4-tetrahydrofuranylbenzoyl)-9H-carbazol-3-yl]-1-(O-acetyloxime), ethanone-1-[9-ethyl-6-(2-methyl-4-tetrahydropyranylbenzoyl)-9H-carbazol-3-yl]-1-(O-acetyloxime), ethanone-1-[9-ethyl-6-(2-methyl-5-tetrahydrofuranylbenzoyl)-9H-carbazol-3-yl]-1-(O-acetyloxime), ethanone-1-[9-ethyl-6-(2-methyl-5-tetrahydropyranylbenzoyl)-9H-carbazol-3-yl]-1-(O-acetyloxime), ethanone-1-[9-ethyl-6-{2-methyl-4-(2,2-dimethyl-1,3-dioxolanyl)benzoyl}-9H-carbazol-3-yl]-1-(O-acetyloxime), ethanone-1-[9-ethyl-6-(2-methyl-4-tetrahydrofuranylmethoxybenzoyl)-9H-carbazol-3-yl]-1-(O-acetyloxime), ethanone-1-[9-ethyl-6-(2-methyl-4-tetrahydropyranylmethoxybenzoyl)-9H-carbazol-3-yl]-1-(O-acetyloxime), ethanone-1-[9-ethyl-6-(2-methyl-5-tetrahydrofuranylmethoxybenzoyl)-9H-carbazol-3-yl]-1-(O-acetyl oxime), ethanone-1-[9-ethyl-6-(2-methylbenzoyl)-9H-carbazol-3-yl]-1-(O-acetyloxime), ethanone-1-[9-ethyl-6-(2-methyl-5-tetrahydropyranyl-methoxybenzoyl)-9H-carbazol-3-yl]-1-(O-acetyloxime), and ethanone-1-[9-ethyl-6-{2-methyl-4-(2,2-dimethyl-1,3-dioxolanyl)methoxybenzoyl}-9H-carbazol-3-yl]-1-(O-acetyloxime).

Commercially available photo-radical generators may be used directly. Specific examples thereof include those available under the following trade names: Irgacure 907, Irgacure 184, Irgacure 369, Irgacure 651, Irgacure 819, Irgacure 907, Irgacure OXE02, and Irgacure OXE02 manufactured by BASF; and ADEKA ARKLS N1919T manufactured by ADEKA Corporation.

Examples of anionic polymerization initiators include alkyl lithium compounds; monolithium salts or monosodium salts of biphenyl, naphthalene, pyrene and the like; and polyfunctional initiators such as dilithium salts and trilithium salts.

Examples of cationic polymerization initiators include protic acids such as sulfuric acid, phosphoric acid, perchloric acid, and trifluoromethanesulfonic acid; Lewis acids such as boron trifluoride, aluminum chloride, titanium tetrachloride, and tin tetrachloride; and aromatic onium salts or combinations of aromatic onium salts and reducing agents.

These polymerization initiators may be used singly or in combination of two or more kinds.

The amount of the polymerization initiator added in the polymerizable liquid crystal composition is usually 0.1 to 30 parts by mass, more preferably 0.5 to 10 parts by mass, per 100 parts by mass of the polymerizable liquid crystal compound contained in the polymerizable liquid crystal composition.

(2-5) Additional Component The polymerizable liquid crystal composition may further comprise, in addition to a polymerizable liquid crystal compound, an organic solvent, a polymerization initiator and a surfactant, an additional component as long as an effect of the present disclosure is not compromised. Examples of additional components include metals, metal complexes, dyes, pigments, fluorescent materials, phosphorescent materials, leveling agents, thixotropic agents, gelling agents, polysaccharides, ultraviolet absorbers, infrared absorbers, antioxidants, ion exchange resins, and metal oxides such as titanium oxide.

Additional components also include additional copolymerizable monomers. Specific examples of additional copolymerizable monomers include, but not particularly limited to, 4'-methoxyphenyl 4-(2-methacryloyloxyethyloxy)benzoate, biphenyl 4-(6-methacryloyloxyhexyloxy)benzoate, 4'-cyanobiphenyl 4-(2-acryloyloxyethyloxy)benzoate, 4'-cyanobiphenyl 4-(2-methacrylolyoxyethyloxy)benzoate, 3',4'-difluorophenyl 4-(2-methacrylolyoxyethyloxy)benzoate, naphthyl 4-(2-methacryloyloxyethyloxy)benzoate, 4-acryloyloxy-4'-decylbiphenyl, 4-acryloyloxy-4'-cyanobiphenyl, 4-(2-acryloyloxyethyloxy)-4'-cyanobiphenyl, 4-(2-methacryloyloxyethyloxy)-4'-methoxybiphenyl, 4-(2-methacryloyloxyethyloxy)-4'-(4"-fluorobenzyloxy)-biphenyl, 4-acryloyloxy-4'-propylcyclohexylphenyl, 4-methacryloyl-4'-butylbicyclohexyl, 4-acryloyl-4'-amyltolan, 4-acryloyl-4'-(3,4-difluorophenyl) bicyclohexyl, (4-amylphenyl) 4-(2-acryloyloxyethyl)benzoate, (4-(4'-propylcyclohexyl) phenyl) 4-(2-acryloyloxyethyl)benzoate, "LC-242" (trade name) manufactured by BASF, trans-1,4-bis [4-[6-(acryloyloxy)hexyloxy]phenyl]cyclohexanedicarboxylate, and compounds described in JP2007002208A, JP2009173893A, JP2009274984A, JP2010030979A, JP2010031223A, JP2011006360A, JP2010024438A, WO2012141245A1, WO2012147904A1, WO2012169424A1, WO2012076679A1, WO2013180217A1, WO2014010325A1, WO2014061709A1, WO2014065176A1, WO2014126113A1, WO2015025793A1, WO2015064698A1, WO2015122384A1, and WO2015122385A.

The amount of these additional components added in the polymerizable liquid crystal composition is usually 0.005 to 50 parts by mass per 100 parts by mass of the polymerizable liquid crystal compound contained in the polymerizable liquid crystal composition.

(2-6) Salt Represented by Formula (I) and Nitrogen-Containing Compound Represented by Formula (II)

From the viewpoint of sufficiently reducing gelation, it is preferred that the amount of the salt represented by formula (I) contained in the polymerizable liquid crystal composition is 0 part by mass or more and less than 0.01 parts by mass per 100 parts by mass of the polymerizable liquid crystal compound, more preferably 0.008 parts by mass or less, even more preferably 0.003 parts by mass or less, and particularly preferably below the lower limit of quantification by ICS-1500 (DIONEX ion chromatography system).

From the viewpoint of sufficiently reducing gelation, it is preferred that the amount of the nitrogen-containing compound represented by formula (II) contained in the polymerizable liquid crystal composition is 0 part by mass or more and 0.01 parts by mass or less per 100 parts by mass of the polymerizable liquid crystal compound.

Specifically, it is preferred that the disclosed polymerizable liquid crystal composition, which comprises a polymerizable liquid crystal compound and an organic solvent and optionally further comprises at least one of a surfactant, a polymerization initiator and an additional component, comprises the salt represented by formula (I) in an amount of less than 0.01 parts by mass per 100 parts by mass of the polymerizable liquid crystal compound, and the nitrogen-containing compound represented by formula (II) in an amount of 0.01 parts by mass or less per 100 parts by mass of the polymerizable liquid crystal compound.

(2-7) Method of Producing Polymerizable Liquid Crystal Composition

The polymerizable liquid crystal composition is usually prepared by mixing and dissolving, in a suitable organic solvent, predetermined amounts of a polymerizable liquid crystal material and optional components such as a polymerization initiator, a surfactant and/or an additional component.

From the viewpoint of ensuring that a polymerizable liquid crystal composition having long gelation time is obtained, preparation of the polymerizable liquid crystal composition preferably includes the first step of confirming the amounts of the salt represented by formula (I) and the nitrogen-containing compound represented by formula (II) contained in the polymerizable liquid crystal material, prior to the second step of mixing the polymerizable liquid crystal material with an organic solvent. Specifically, when preparing a polymerizable liquid crystal composition, it is preferred to mix the polymerizable liquid crystal material with an organic solvent after confirming that the amount of the salt represented by formula (I) per 100 parts by mass of the polymerizable liquid crystal compound is less than 0.01 parts by mass, preferably 0.008 parts by mass or less, more preferably 0.003 parts by mass or less, and even more preferably below the lower limit of quantification by ICS-1500 (DIONEX ion chromatography system), and that the amount of the nitrogen-containing compound represented by formula (II) per 100 parts by mass of the polymerizable liquid crystal compound is 0.01 parts by mass or less.

When the amount of the salt represented by formula (I) per 100 parts by mass of the polymerizable liquid crystal compound has been found to be 0.01 parts by mass or more and/or the amount of the nitrogen-containing compound represented by formula (II) per 100 parts by mass of the polymerizable liquid crystal compound has been found to be greater than 0.01 parts by mass in the first step, the polymerizable liquid crystal material may be mixed with an organic solvent after purifying the polymerizable liquid crystal material such that the amounts of the salt represented by formula (I) and the nitrogen-containing compound represented by formula (II) fall within the respective ranges set forth above.

The method of confirming the amounts of the salt represented by formula (I) and the nitrogen-containing compound represented by formula (II) is not limited to a particular method. For example, the amounts can be quantified with an analyzer such as, for example, an elemental analyzer, a nuclear magnetic resonance (NMR) analyzer, or an ion chromatograph analyzer.

Alternatively, confirmation of the amounts of the salt represented by formula (I) and the nitrogen-containing compound represented by formula (II) may be carried out by performing, in advance, a preliminary test or the like to obtain a relationship between a preparation condition of the polymerizable liquid crystal material and the amounts of the salt represented by formula (I) and the nitrogen-containing compound represented by formula (II) contained in a polymerizable liquid crystal material prepared under that preparation condition, and then obtaining amounts based on the relationship thus obtained and the preparation condition actually used to prepare the polymerizable liquid crystal material.

(3) Polymer

The disclosed polymer is obtained by polymerizing the polymerizable liquid crystal material or polymerizable liquid crystal composition described above.

The term "polymerization" as used herein means a chemical reaction in a broad sense including, in addition to a normal polymerization reaction, a cross-linking reaction.

The disclosed polymer usually has a monomer unit derived from the polymerizable liquid crystal compound.

The disclosed polymer can be favorably used as a constituent material of, for example, optical films.

The disclosed polymer can be used in any form suitable for an intended application, e.g., film form, powder form, or layer form formed of an aggregate of powder.

Specifically, a film made of the polymer can be suitably used as a constituent material of an optical film and an optically anisotropic body which are described later. Powders of the polymer can be utilized for paints, anti-counterfeit articles, security articles, and other applications. A layer made of a powder of the polymer can be favorably used as a constituent material of an optically anisotropic body.

The disclosed polymer can be suitably produced by: (a) a method wherein a polymerization reaction of the polymerizable liquid crystal material or polymerizable liquid crystal composition described above is performed in the presence of an appropriate organic solvent, the obtained target polymer is isolated and dissolved into an appropriate organic solvent to prepare a solution, the solution is applied onto a suitable substrate to form a coating film, and the coating film is dried and optionally heated; (β) a method wherein the polymerizable liquid crystal composition described above is applied onto a substrate by known coating methods, the solvent is removed, and then a polymerization reaction is performed by heating or irradiation with active energy rays; and so forth.

The polymerizable liquid crystal material may be polymerized alone.

The organic solvent, substrate, coating method, drying method, and polymerization conditions used to prepare the polymer by the methods described above are not particularly limited, and any products, methods and conditions which may be used in the fields of polymer production using polymerizable liquid crystal compositions, e.g., those described for example in JP6055569B, may be employed.

The polymer obtained as described above can then be transferred from the substrate for use, removed from the substrate for single use, or used as it is as the constituent material of an optical film etc., without being removed from the substrate.

Further, the polymer removed from the substrate can also be made into powder form by grinding methods known in the art prior to use.

The number-average molecular weight of the disclosed polymer obtained as described above is preferably 500 to 500,000, more preferably 5,000 to 300,000. A number-average molecular weight that falls within these ranges desirably provides high hardness and excellent handleability. The number-average molecular weight of the polymer can be determined by gel permeation chromatography (GPC) using monodisperse polystyrene as a standard with tetrahydrofuran as an eluent.

(4) Optical Film

The disclosed optical film is formed using the disclosed polymer and/or polymerizable liquid crystal material and includes a layer having an optical function. The term "optical function" as used herein means simple transmittance, reflection, refraction, birefringence or the like. The disclosed optical film may be either an optical film which comprises the disclosed polymer as a main constituent material of a layer having an optical function, or an optical film whose layer having an optical function comprises the disclosed polymerizable liquid crystal material. Preferably, the optical film which comprises the disclosed polymer as a constituent material has an occupancy ratio of the disclosed polymer in excess of 50% by mass when the ratio of all components of the layer having the optical function is taken as 100% by mass. The optical film which comprises the disclosed polymerizable liquid crystal material preferably comprises 0.01% by mass or more of the disclosed polymerizable liquid crystal material when the ratio of all components of the layer having the optical function is taken as 100% by mass.

The disclosed optical film may be used in any of the following arrangements: (alignment substrate/(alignment film)/optical film) arrangement where the optical film remains formed on an alignment substrate having an optional alignment film; (transparent substrate film/optical film) arrangement where the optical film has been transferred to a transparent substrate film or the like which is different from an alignment substrate; and a single layer arrangement (i.e., optical film alone) when the optical film is self-supportive.

The alignment film and the alignment substrate can be the same as those for the optically anisotropic body which is described later.

The disclosed optical film can be produced by: (A) a method which involves applying on an alignment substrate the disclosed polymerizable liquid crystal composition, drying the resulting coating film, and subjecting the coating film to heat treatment (for alignment of liquid crystals) and irradiation and/or heating treatment (for polymerization); (B) a method which involves applying on an alignment substrate a solution of a liquid crystal polymer obtained by polymerization of the disclosed polymerizable liquid crystal material or the disclosed polymerizable liquid crystal composition, and optionally drying the resulting coating film; or (C) a method which involves applying on an alignment substrate a solution containing the disclosed polymerizable liquid crystal material and resin, and drying the resulting coating film.

The disclosed optical film can be used for optically anisotropic bodies, alignment films for liquid crystal display devices, color filters, low-pass filters, polarization prisms, and various optical filters.

The disclosed optical film preferably has an α-value and a β-value that fall within respective given ranges, which values are determined from retardations at wavelengths from 400 nm to 800 nm as measured using the Axoscan Mueller Matrix Polarimeter. Specifically, the α-value is preferably 0.70 to 0.99, and more preferably 0.75 to 0.90. The β-value is preferably 1.00 to 1.20, and more preferably 1.01 to 1.20. α=(retardation at 450 nm)/(retardation at 550 nm) β=(retardation at 650 nm)/(retardation at 550 nm)

(5) Optically Anisotropic Body

The disclosed optically anisotropic body has a layer which comprises the disclosed polymer as the constituent material.

The disclosed optically anisotropic body can be obtained for example by forming an alignment film on a substrate and forming a layer made of the disclosed polymer (liquid crystal layer) on the alignment film. The disclosed optically anisotropic body may be obtained by directly forming a layer made of the disclosed polymer (liquid crystal layer) on a substrate, or may consist only of a layer made of the disclosed polymer (liquid crystal layer).

The layer may be made of the polymer in film form or may be an aggregate of powdery polymer.

The alignment film is formed on the surface of a substrate to regulate molecules of the polymerizable liquid crystal compound to align in one direction in a plane.

The alignment film can be obtained by applying a solution (alignment film composition) containing a polymer such as polyimide, polyvinyl alcohol, polyester, polyarylate, polyamideimide or polyetherimide on a substrate to form a film, drying the film, and rubbing the film in one direction. As an alternative method to rubbing, polarized UV light may be directed to the surface of the alignment film to confer a function of aligning molecules in one direction in a plane.

Examples of substrates on which the alignment film is to be formed include glass substrates and substrates formed of synthetic resin films. Examples of synthetic resins include thermoplastic resins such as acrylic resins, polycarbonate resins, polyethersulfone resins, polyethylene terephthlate resins, polyimide resins, polymethyl methacrylate resins, polysulfone resins, polyarylate resins, polyethylene resins, polystyrene resins, polyvinyl chloride resins, cellulose diacetate, cellulose triacetate, and alicyclic olefin polymers.

Examples of alicyclic olefin polymers include cyclic olefin random multi-component copolymers described in JPH05310845A and US5,179,171B; hydrogenated polymers described in JPH0597978A and US5,202,388B; and thermoplastic dicyclopentadiene open-ring polymers and hydrogenated products thereof described in JPH11124429A (WO9920676).

Herein, examples of methods of forming a liquid crystal layer made of the disclosed polymer on an alignment film are the same as the methods (methods (α) and (β)) described in the above section of the disclosed polymer.

The thickness of the resulting liquid crystal layer is not limited to a particular value but is normally 1 to 10 μm.

Non-limiting examples of the disclosed optically anisotropic body include retardation plates and viewing-angle enhancing films.

The disclosed optically anisotropic body preferably has an α-value and a β-value that fall within respective given ranges, which values are determined from retardations at wavelengths from 400 nm to 800 nm as measured using the Axoscan Mueller Matrix Polarimeter. Specifically, the α-value is preferably 0.70 to 0.99, and more preferably 0.75 to 0.90. The β-value is preferably 1.00 to 1.20, and more preferably 1.01 to 1.20. α=(retardation at 450 nm)/(retardation at 550 nm) β=(retardation at 650 nm)/(retardation at 550 nm)

(6) Polarizing Plate

The disclosed polarizing plate comprises the disclosed optically anisotropic body and a polarizing film.

A specific example of the disclosed polarizing plate is one obtained by laminating the disclosed optically anisotropic body on a polarizing film either directly or with one or more other layers (glass plate, etc) interposed between the optically anisotropic body and the polarizing film.

In the disclosed polarizing plate, the polarizing film and the disclosed optically anisotropic body may be bonded with an adhesive layer made of an adhesive (including tackifier). The average thickness of the adhesive layer is normally 0.01 to 30 μm, preferably 0.1 to 15 μm. The adhesive layer preferably has a tensile fracture strength of 40 MPa or less as measured in accordance with JIS K7113.

The polarizing film and the adhesive described above are not limited to particular types and any of the polarizing films and adhesives used in the fields of polarizing plates, e.g., those described in JP6055569B may be employed.

(7) Display Device

The disclosed display device comprises the disclosed polarizing plate.

Examples of the display device include those comprising a panel such as a liquid crystal panel or an organic electroluminescence panel. Specific examples of the display device include a flat panel display device comprising a polarizing plate and a liquid crystal panel, and an organic electroluminescence display device comprising a polarizing plate and an organic electroluminescence panel.

(8) Anti-Reflection Film

The disclosed anti-reflection film comprises the disclosed polarizing plate.

The anti-reflection film is not limited to a particular type and can be used for anti-reflection of a flat panel display device, for example.

EXAMPLES

The present disclosure will be described in more detail below based on Examples, which however shall not be construed as limiting the scope of the present disclosure.

Measurements of amounts of a salt and a nitrogen-containing compound and evaluations of the stability over time of polymerizable liquid crystal compositions were performed by the methods described below.

<Measurement of Amounts of Salt and Nitrogen-Containing Compound>

The amounts of a salt and a nitrogen-containing compound in a polymerizable liquid crystal material were measured by ion chromatography.

Specifically, 0.5 parts by mass of a polymerizable liquid crystal material was dissolved in 10 parts by mass of chloroform containing ethanol (1% by mass) as a stabilizer. 15 parts by mass of ultrapure water was then added to the resulting solution, shaken for 2 minutes, and allowed to stand for 2 hours. With a syringe, only the aqueous layer was collected from the solution to prepare a sample solution.

Separately, calibration curves were prepared in advance for the salt and nitrogen-containing compound to be measured using standard solutions having known concentrations of 1, 10, 100, and 1,000 ppm by mass.

The sample solution was then analyzed by ion chromatography under the following analysis conditions for measuring the amounts of the salt and nitrogen-containing compound.

[Analysis Conditions]
Equipment: ICS-1500 (DIONEX)
Column: CS17+CG17
Eluent: 6 mM methanesulfonic acid
Flow rate: 1.2 mL/min
Column temperature: 40° C.
Detector: electrical conductivity detector <Evaluations of Stability Over Time of Polymerizable Liquid Crystal Composition>

The prepared polymerizable liquid crystal composition was stored in an environment having a temperature of 45° C. and the presence of foreign matter (gel) was visually checked. Stability over time was evaluated based on the criteria given below. The longer the time until foreign matter is generated (gelation time), the better the stability over time.

A: No foreign matter is generated for 240 hours or more

B: Foreign matter is generated at a time point from 96 hours to less than 240 hours C: Foreign matter is generated at a time point between 0 hour and less than 96 hours.

Examples 1 to 12 and Comparative Examples 1 to 18

The following compound A was provided as a polymerizable liquid crystal compound.

Compound A

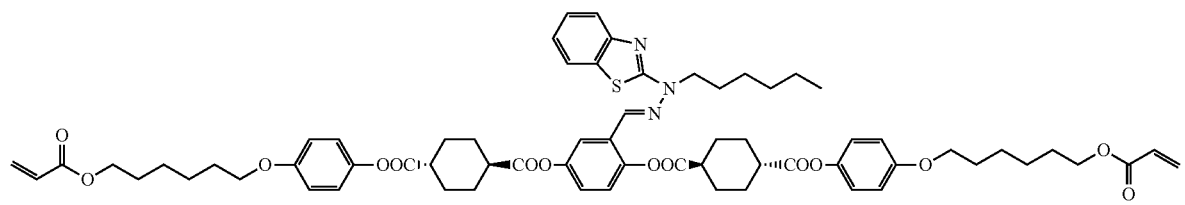

As the salts represented by formula (I), the following salts were provided: ammonium chloride, methylamine hydrochloride, ethylamine hydrochloride, dimethylamine hydrochloride, diethylamine hydrochloride, trimethylamine hydrochloride, tri ethyl amine hydrochloride, tetramethylammonium chloride, and tetraethylammonium chloride.

The compound A and the salts shown in Table 1 were added at the ratios shown in Table 1 to prepare polymerizable liquid crystal materials. The amounts of the salt and the nitrogen-containing compound contained in each polymerizable liquid crystal material were measured. The results are shown in Table 1.

Polymerizable liquid crystal compositions were obtained by mixing the polymerizable liquid crystal materials with cyclopentanone and 1,3-dioxolane (organic solvent) such that 141.8 parts by mass of cyclopentanone and 212.7 parts by mass of 1,3-dioxolane were contained per 100 parts by mass of the compound A. Stability over time of each polymerizable liquid crystal composition was then evaluated. The results are shown in Table 1.

Examples 13 to 19 and Comparative Examples 19-32

Polymerizable liquid crystal materials and polymerizable liquid crystal compositions were prepared as in Example 1 except that instead of the compound A, the following compound B, compound C, compound D, compound E, compound F, compound G or a mixture of compounds F and G (F:G=3:1 (by mass)) was used as the polymerizable liquid crystal compound, and that as the salt represented by formula (I), dimethylamine hydrochloride was added at the ratio shown in Table 2. Measurements and evaluations were made as in Example 1. The results are shown in Table 2.

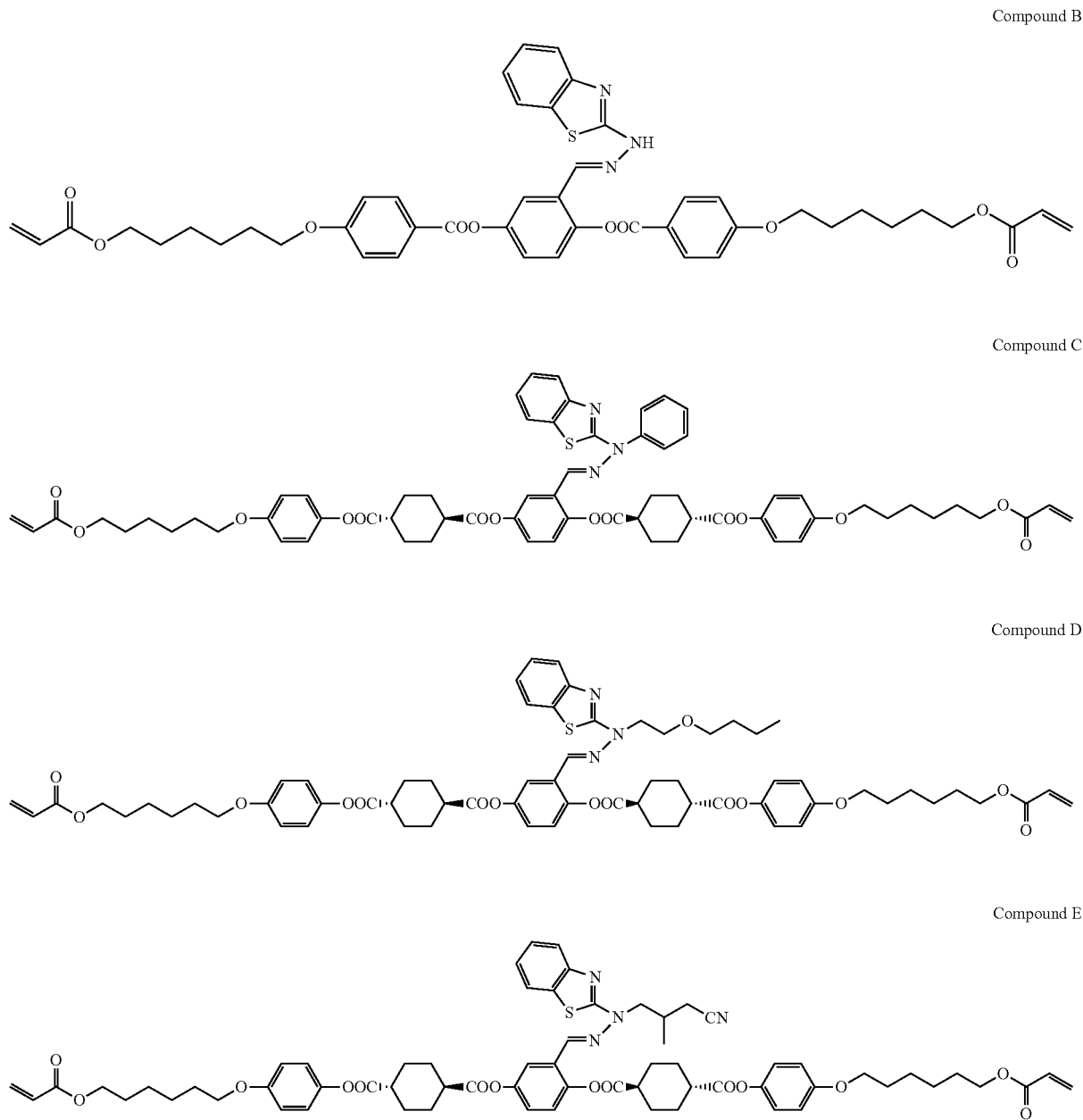

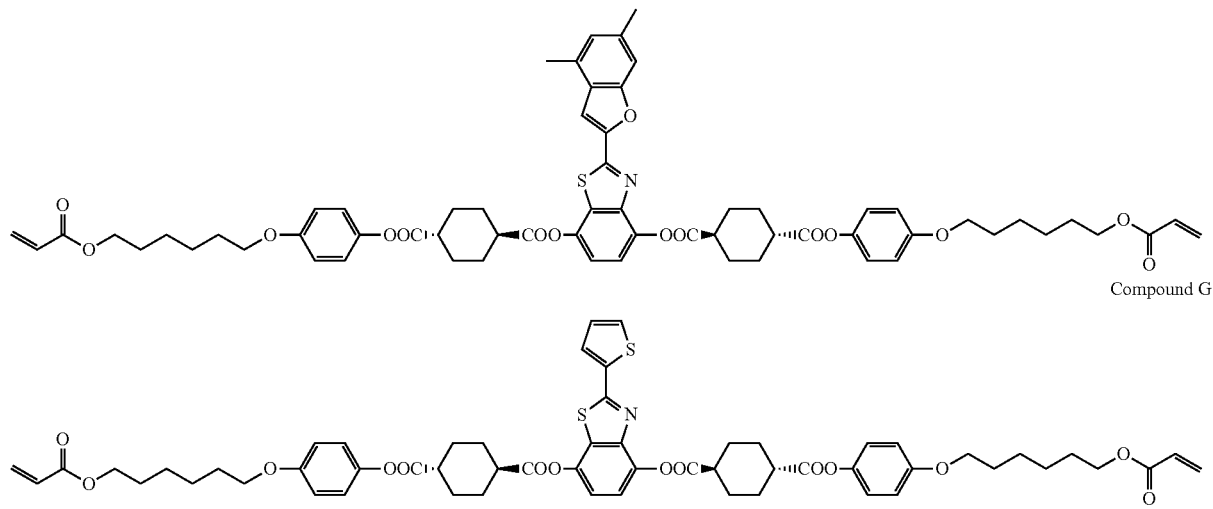

Compound F

Compound G

Examples 20 to 23 and Comparative Examples 33 to 34

Polymerizable liquid crystal materials and polymerizable liquid crystal compositions were prepared as in Example 1 except that instead of the salt represented by the formula (I), methylamine or ethylamine was added at the ratio shown in Table 3 as the nitrogen-containing compound represented by the formula (II). Measurements and evaluations were made as in Example 1. The results are shown in Table 3.

Reference Examples 1 to 12

Polymerizable liquid crystal materials and polymerizable liquid crystal compositions were prepared as in Example 1 except that instead of the salt represented by the formula (I), dimethylamine, diethylamine, trimethylamine or triethylamine was added at the ratio shown in Table 4 as the nitrogen-containing compound represented by the formula (II). Measurements and evaluations were made as in Example 1. The results are shown in Table 4.

TABLE 1

|  | Polymerizable liquid crystal compound | Salt represented by formula (I) | | | | | | Nitrogen-containing compound represented by formula (II) | | | | Evaluation result |
|---|---|---|---|---|---|---|---|---|---|---|---|---|
|  |  | Structure | | | | | Amount*1 [parts by mass] | Structure | | | Amount*1 [parts by mass] |  |
|  |  | $R^1$ | $R^2$ | $R^3$ | $R^4$ | X |  | $R^5$ | $R^6$ | $R^7$ |  |  |
| Ex. 1 | A | H | H | H | H | Cl⁻ | <0.0005 | — | — | — | — | A |
| Comp. Ex. 1 | A | H | H | H | H | Cl⁻ | 0.01 | — | — | — | — | C |
| Comp. Ex. 2 | A | H | H | H | H | Cl⁻ | 0.1 | — | — | — | — | C |
| Ex. 2 | A | H | H | H | —CH₃ | Cl⁻ | <0.0005 | — | — | — | — | A |
| Comp. Ex. 3 | A | H | H | H | —CH₃ | Cl⁻ | 0.01 | — | — | — | — | C |
| Comp. Ex. 4 | A | H | H | H | —CH₃ | Cl⁻ | 0.1 | — | — | — | — | C |
| Ex. 3 | A | H | H | H | —CH₂CH₃ | Cl⁻ | <0.0005 | — | — | — | — | A |
| Comp. Ex. 5 | A | H | H | H | —CH₂CH₃ | Cl⁻ | 0.01 | — | — | — | — | C |
| Comp. Ex. 6 | A | H | H | H | —CH₂CH₃ | Cl⁻ | 0.1 | — | — | — | — | C |
| Ex. 4 | A | H | H | —CH₃ | —CH₃ | Cl⁻ | <0.0005 | — | — | — | — | A |
| Ex. 5 | A | H | H | —CH₃ | —CH₃ | Cl⁻ | 0.003 | — | — | — | — | A |
| Ex. 6 | A | H | H | —CH₃ | —CH₃ | Cl⁻ | 0.006 | — | — | — | — | B |
| Ex. 7 | A | H | H | —CH₃ | —CH₃ | Cl⁻ | 0.008 | — | — | — | — | B |
| Comp. Ex. 7 | A | H | H | —CH₃ | —CH₃ | Cl⁻ | 0.01 | — | — | — | — | C |
| Comp. Ex. 8 | A | H | H | —CH₃ | —CH₃ | Cl⁻ | 0.1 | — | — | — | — | C |
| Ex. 8 | A | H | H | —CH₂CH₃ | —CH₂CH₃ | Cl⁻ | <0.0005 | — | — | — | — | A |
| Comp. Ex. 9 | A | H | H | —CH₂CH₃ | —CH₂CH₃ | Cl⁻ | 0.01 | — | — | — | — | C |
| Comp. Ex. 10 | A | H | H | —CH₂CH₃ | —CH₂CH₃ | Cl⁻ | 0.1 | — | — | — | — | C |

TABLE 1-continued

| | Polymerizable liquid crystal compound | Salt represented by formula (I) | | | | | | Nitrogen-containing compound represented by formula (II) | | | | Evaluation result |
|---|---|---|---|---|---|---|---|---|---|---|---|---|
| | | Structure | | | | | Amount*1 [parts by mass] | Structure | | | Amount*1 [parts by mass] | |
| | | $R^1$ | $R^2$ | $R^3$ | $R^4$ | X | | $R^5$ | $R^6$ | $R^7$ | | |
| Ex. 9 | A | H | —$CH_3$ | —$CH_3$ | —$CH_3$ | $Cl^-$ | <0.0005 | — | — | — | — | A |
| Comp. Ex. 11 | A | H | —$CH_3$ | —$CH_3$ | —$CH_3$ | $Cl^-$ | 0.01 | — | — | — | — | C |
| Comp. Ex. 12 | A | H | —$CH_3$ | —$CH_3$ | —$CH_3$ | $Cl^-$ | 0.1 | — | — | — | — | C |
| Ex. 10 | A | H | —$CH_2CH_3$ | —$CH_2CH_3$ | —$CH_2CH_3$ | $Cl^-$ | <0.0005 | — | — | — | — | A |
| Comp. Ex. 13 | A | H | —$CH_2CH_3$ | —$CH_2CH_3$ | —$CH_2CH_3$ | $Cl^-$ | 0.01 | — | — | — | — | C |
| Comp. Ex. 14 | A | H | —$CH_2CH_3$ | —$CH_2CH_3$ | —$CH_2CH_3$ | $Cl^-$ | 0.1 | — | — | — | — | C |
| Ex. 11 | A | —$CH_3$ | —$CH_3$ | —$CH_3$ | —$CH_3$ | $Cl^-$ | <0.0005 | — | — | — | — | A |
| Comp. Ex. 15 | A | —$CH_3$ | —$CH_3$ | —$CH_3$ | —$CH_3$ | $Cl^-$ | 0.01 | — | — | — | — | C |
| Comp. Ex. 16 | A | —$CH_3$ | —$CH_3$ | —$CH_3$ | —$CH_3$ | $Cl^-$ | 0.1 | — | — | — | — | C |
| Ex. 12 | A | —$CH_2CH_3$ | —$CH_2CH_3$ | —$CH_2CH_3$ | —$CH_2CH_3$ | $Cl^-$ | <0.0005 | — | — | — | — | A |
| Comp. Ex. 17 | A | —$CH_2CH_3$ | —$CH_2CH_3$ | —$CH_2CH_3$ | —$CH_2CH_3$ | $Cl^-$ | 0.01 | — | — | — | — | C |
| Comp. Ex. 18 | A | —$CH_2CH_3$ | —$CH_2CH_3$ | —$CH_2CH_3$ | —$CH_2CH_3$ | $Cl^-$ | 0.1 | — | — | — | — | C |

*1 Amount per 100 parts by mass of polymerizable liquid crystal compound

TABLE 2

| | Polymerizable liquid crystal compound | Salt represented by formula (I) | | | | | | Nitrogen-containing compound represented by formula (II) | | | | Evaluation result |
|---|---|---|---|---|---|---|---|---|---|---|---|---|
| | | Structure | | | | | Amount*1 [parts by mass] | Structure | | | Amount*1 [parts by mass] | |
| | | $R^1$ | $R^2$ | $R^3$ | $R^4$ | X | | $R^5$ | $R^6$ | $R^7$ | | |
| Ex. 13 | B | H | H | —$CH_3$ | —$CH_3$ | $Cl^-$ | <0.0005 | — | — | — | — | A |
| Comp. Ex. 19 | B | H | H | —$CH_3$ | —$CH_3$ | $Cl^-$ | 0.01 | — | — | — | — | C |
| Comp. Ex. 20 | B | H | H | —$CH_3$ | —$CH_3$ | $Cl^-$ | 0.1 | — | — | — | — | C |
| Ex. 14 | C | H | H | —$CH_3$ | —$CH_3$ | $Cl^-$ | <0.0005 | — | — | — | — | A |
| Comp. Ex. 21 | C | H | H | —$CH_3$ | —$CH_3$ | $Cl^-$ | 0.01 | — | — | — | — | C |
| Comp. Ex. 22 | C | H | H | —$CH_3$ | —$CH_3$ | $Cl^-$ | 0.1 | — | — | — | — | C |
| Ex. 15 | D | H | H | —$CH_3$ | —$CH_3$ | $Cl^-$ | <0.0005 | — | — | — | — | A |
| Comp. Ex. 23 | D | H | H | —$CH_3$ | —$CH_3$ | $Cl^-$ | 0.01 | — | — | — | — | C |
| Comp. Ex. 24 | D | H | H | —$CH_3$ | —$CH_3$ | $Cl^-$ | 0.1 | — | — | — | — | C |
| Ex. 16 | E | H | H | —$CH_3$ | —$CH_3$ | $Cl^-$ | <0.0005 | — | — | — | — | A |
| Comp. Ex. 25 | E | H | H | —$CH_3$ | —$CH_3$ | $Cl^-$ | 0.01 | — | — | — | — | C |
| Comp. Ex. 26 | E | H | H | —$CH_3$ | —$CH_3$ | $Cl^-$ | 0.1 | — | — | — | — | C |
| Ex. 17 | F | H | H | —$CH_3$ | —$CH_3$ | $Cl^-$ | <0.0005 | — | — | — | — | A |
| Comp. Ex. 27 | F | H | H | —$CH_3$ | —$CH_3$ | $Cl^-$ | 0.01 | — | — | — | — | C |
| Comp. Ex. 28 | F | H | H | —$CH_3$ | —$CH_3$ | $Cl^-$ | 0.1 | — | — | — | — | C |
| Ex. 18 | G | H | H | —$CH_3$ | —$CH_3$ | $Cl^-$ | <0.0005 | — | — | — | — | A |
| Comp. Ex. 29 | G | H | H | —$CH_3$ | —$CH_3$ | $Cl^-$ | 0.01 | — | — | — | — | C |
| Comp. Ex. 30 | G | H | H | —$CH_3$ | —$CH_3$ | $Cl^-$ | 0.1 | — | — | — | — | C |
| Ex. 19 | F + G | H | H | —$CH_3$ | —$CH_3$ | $Cl^-$ | <0.0005 | — | — | — | — | A |
| Comp. Ex. 31 | F + G | H | H | —$CH_3$ | —$CH_3$ | $Cl^-$ | 0.01 | — | — | — | — | C |
| Comp. Ex. 32 | F + G | H | H | —$CH_3$ | —$CH_3$ | $Cl^-$ | 0.1 | — | — | — | — | C |

*1 Amount per 100 parts by mass of polymerizable liquid crystal compound

TABLE 3

| | Polymerizable liquid crystal compound | Salt represented by formula (I) Structure R¹ R² R³ R⁴ X | Amount*¹ [parts by mass] | Nitrogen-containing compound represented by formula (II) Structure R⁵ R⁶ R⁷ | Amount*¹ [parts by mass] | Evaluation result |
|---|---|---|---|---|---|---|
| Ex. 20 | A | — — — — — — | — | —$CH_3$  H  H | <0.0005 | A |
| Ex. 21 | A | — — — — — — | — | —$CH_3$  H  H | 0.01 | A |
| Comp. Ex. 33 | A | — — — — — — | — | —$CH_3$  H  H | 0.1 | C |
| Ex. 22 | A | — — — — — — | — | —$CH_2CH_3$  H  H | <0.0005 | A |
| Ex. 23 | A | — — — — — — | — | —$CH_2CH_3$  H  H | 0.01 | A |
| Comp. Ex. 34 | A | — — — — — — | — | —$CH_2CH_3$  H  H | 0.1 | C |

*¹Amount per 100 parts by mass of polymerizable liquid crystal compound

TABLE 4

| | Polymerizable liquid crystal compound | Salt represented by formula (I) Structure R¹ R² R³ R⁴ X | Amount*¹ [parts by mass] | Nitrogen-containing compound represented by formula (II) Structure R⁵ R⁶ R⁷ | Amount*¹ [parts by mass] | Evaluation result |
|---|---|---|---|---|---|---|
| Ref. Ex. 1 | A | — — — — — — | — | —$CH_3$  —$CH_3$  H | <0.0005 | A |
| Ref. Ex. 2 | A | — — — — — — | — | —$CH_3$  —$CH_3$  H | 0.01 | A |
| Ref. Ex. 3 | A | — — — — — — | — | —$CH_3$  —$CH_3$  H | 0.1 | A |
| Ref. Ex. 4 | A | — — — — — — | — | —$CH_2CH_3$ —$CH_2CH_3$  H | <0.0005 | A |
| Ref. Ex. 5 | A | — — — — — — | — | —$CH_2CH_3$ —$CH_2CH_3$  H | 0.01 | A |
| Ref. Ex. 6 | A | — — — — — — | — | —$CH_2CH_3$ —$CH_2CH_3$  H | 0.1 | A |
| Ref. Ex. 7 | A | — — — — — — | — | —$CH_3$  —$CH_3$  —$CH_3$ | <0.0005 | A |
| Ref. Ex. 8 | A | — — — — — — | — | —$CH_3$  —$CH_3$  —$CH_3$ | 0.01 | A |
| Ref. Ex. 9 | A | — — — — — — | — | —$CH_3$  —$CH_3$  —$CH_3$ | 0.1 | A |
| Ref. Ex. 10 | A | — — — — — — | — | —$CH_2CH_3$ —$CH_2CH_3$ —$CH_2CH_3$ | <0.0005 | A |
| Ref. Ex. 11 | A | — — — — — — | — | —$CH_2CH_3$ —$CH_2CH_3$ —$CH_2CH_3$ | 0.01 | A |
| Ref. Ex. 12 | A | — — — — — — | — | —$CH_2CH_3$ —$CH_2CH_3$ —$CH_2CH_3$ | 0.1 | A |

*¹Amount per 100 parts by mass of polymerizable liquid crystal compound

It can be learned from Tables 1 to 3 that Examples 1 to 23 were able to provide polymerizable liquid crystal compositions which can sufficiently reduce gelation and therefore have long gelation time compared to those prepared in Comparative Examples 1 to 34.

Of note, it can be learned from Reference Examples 1 to 12 shown in Table 4 that no gelation problem occurs even if a secondary or tertiary alkylamine is included.

INDUSTRIAL APPLICABILITY

According to the present disclosure, it is possible to provide a polymerizable liquid crystal composition which does not easily undergo gelation (i.e., has long gelation time) and a polymerizable liquid crystal material from which the polymerizable liquid crystal composition can be prepared.

According to the present disclosure, it is also possible to provide a polymer obtainable by polymerizing the polymerizable liquid crystal material, an optical film and an optically anisotropic body which comprise the polymer, and a polarizing plate, an anti-reflection film and a display device which comprise the optically anisotropic body.

The invention claimed is:

1. A polymerizable liquid crystal material comprising a polymerizable liquid crystal compound, further comprising a salt represented by following formula (I) or a nitrogen-containing compound represented by the following formula (II),

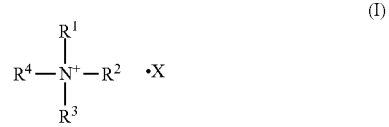

where $R^1$ to $R^4$ each independently represent a hydrogen atom or a C1-C7 alkyl group, and X represents $F^-$, $Br^-$, $Cl^-$, $1/2\ HSO_4^-$, $1/2(H_2PO_4^{2-})$, $H_2PO_4^-$, $R-C(=O)-O^-$, $1/2\ (^-O-(C=O)-R'-(C=O)-O^-)$ or $R-SO_3^-$, where R represents a hydrogen atom or a monovalent hydrocarbon group, and R' represents a single bond or a divalent hydrocarbon group,

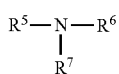
(II)

where $R^5$ represents a hydrogen atom or a C1-C7 alkyl group, and $R^6$ and $R^7$ represent a hydrogen atom, wherein
the salt represented by the preceding formula (I) in an amount of more than 0 part by mass and less than 0.01 parts by mass per 100 parts by mass of the polymerizable liquid crystal compound, and
the nitrogen-containing compound represented by the preceding formula (II) in an amount of more than 0 part by mass and 0.01 parts by mass or less per 100 parts by mass of the polymerizable liquid crystal compound.

2. The polymerizable liquid crystal material of claim 1, wherein the polymerizable liquid crystal compound comprises a compound represented by the following formula (III):

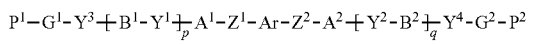
(III)

where Ar represents a group represented by any of the following formulas (1) to (7):

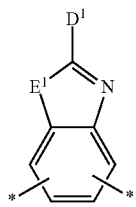
(1)

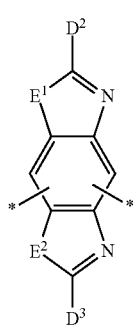
(2)

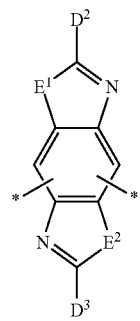
(3)

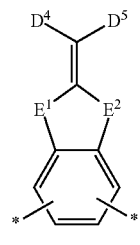
(4)

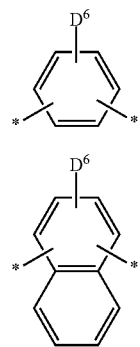
(5)

(6)

(7)

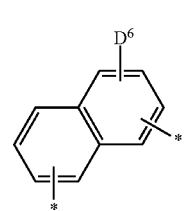

where in formulas (1) to (7), *represents a bond with $Z^1$ or $Z^2$,
in formulas (1) to (4), $E^1$ represents $-CR^{11}R^{12}-$, $-S-$, $-NR^{11}-$, $-C(=O)-$, or $-O-$,
in formulas (2) to (4), $E^2$ represents $-CR^{11}R^{12}-$, $-S-$, $-NR^{11}-$, $-C(=O)-$, or $-O-$,
$R^{11}$ and $R^{12}$ each independently represent a hydrogen atom or a C1-C4 alkyl group,
in formula (1), $D^1$ represents an aromatic hydrocarbon ring group which may have a substituent, or an aromatic heterocyclic group which may have a substituent,
in formulas (2) and (3), $D^2$ and $D^3$ each independently represent an aromatic hydrocarbon ring group which may have a substituent, or an aromatic heterocyclic group which may have a substituent,
in formula (4), $D^4$ and $D^5$ each independently represent an acyclic group which may have a substituent, or an organic group in which $D^4$ and $D^5$ are combined to form a ring,
in formulas (5) to (7), $D^6$ represents $-C(R^f)=N-N(R^g)R^h$, $-C(R^f)=N-N=C(R^g)R^h$, or $-C(R^f)=N-$ N=R$^i$, where R$^f$ represents a hydrogen atom or a C1-C6 alkyl group, R$^g$ represents a hydrogen atom or a C1-C30 organic group which may have a substituent, R$^h$ represents an organic group having one or more aromatic rings selected from the group consisting of a C6-C30 aromatic hydrocarbon ring and a C2-C30 aromatic heterocyclic ring, and R$^i$ represents an organic group having one or more aromatic rings selected from the group consisting of a C6-C30 aromatic hydrocarbon ring and a C2-C30 aromatic heterocyclic ring, and the optionally formulas (1) and (4) to (7) further have at least one substituent Z$^1$ and Z$^2$ each independently represent a single bond, —O—, —O—CH$_2$—, —CH$_2$—O—, —O—CH$_2$—CH$_2$—, —CH$_2$—CH$_2$—O—, —C(=O)—O—, —O—C(=O)—, —C(=O)—S—, —S—C(=O)—, —NR$^{21}$—C(=O)—, —C(=O)—NR$^{21}$—, —CF$_2$—O—, —O—CF$_2$—, —CH$_2$—CH$_2$—, —CF$_2$—CF$_2$—, —O—CH$_2$—CH$_2$—O—, —CH=CH—C(=O)—O—, —O—C(=O)—CH=CH—, —CH$_2$—C(=O)—O—, —O—C(=O)—CH$_2$—, —CH$_2$—O—C(=O)—, —C(=O)—O—CH$_2$—, —CH$_2$—CH$_2$—C(=O)—O—, —O—C(=O)—CH$_2$—CH$_2$—, —CH$_2$—CH$_2$—O—C(=O)—, —C(=O)—O—CH$_2$—CH$_2$—, —CH=CH—, —N=CH—, —CH=N—, —N=C(CH$_3$)—, —C(CH$_3$)=N—, —N=N—, or, where R$^{21}$ represents a hydrogen atom or a C1-C6 alkyl group;

A$^1$, A$^2$, B$^1$ and B$^2$ each independently represent a cyclic aliphatic group which may have a substituent, or an aromatic group which may have a substituent;

Y$^1$ to Y$^4$ each independently represent a single bond, —O—, —C(=O)—, —C(=O)—O—, —O—C(=O)—, —NR$^{22}$—C(=O)—, —C(=O)—NR$^{22}$—, —O—C(=O)—O—, —NR$^{22}$—C(=O)—O—, —O—C(=O)—NR$^{22}$—, or —NR$^{22}$—C(=O)—NR$^{23}$—, where R$^{22}$ and R$^{23}$ each independently represent a hydrogen atom or a C1-C6 alkyl group;

G$^1$ and G$^2$ each independently represent an organic group which is either a C1-C20 aliphatic hydrocarbon group or a C3-C20 aliphatic hydrocarbon group in which one or more methylene groups (—CH$_2$—) are replaced by —O— or —C(=O)—, where one or more hydrogen atoms of the organic group may be replaced by a C1-C5 alkyl group, a C1-C5 alkoxy group or a halogen atom, with the proviso that methylene groups (—CH$_2$—) at both ends of each of G$^1$ and G$^2$ are not replaced by —O— or —C(=O)—;

P$^1$ and P$^2$ each independently represent a polymerizable group; and p and q each independently represent 0 or 1.

3. A polymerizable liquid crystal composition comprising the polymerizable liquid crystal material of claim 1, and an organic solvent.

4. The polymerizable liquid crystal composition of claim 3, further comprising at least one of a surfactant and a polymerization initiator.

5. A polymer obtainable by polymerizing the polymerizable liquid crystal material of claim 1.

6. An optical film comprising the polymer of claim 5 as a constituent material.

7. An optically anisotropic body comprising the polymer of claim 5 as a constituent material.

8. A polarizing plate comprising the optically anisotropic body of claim 7 and a polarizing film.

9. A display device comprising the polarizing plate of claim 8.

10. An anti-reflection film comprising the polarizing plate of claim 8.

11. A method of producing a polymerizable liquid crystal composition, comprising:

a first step of measuring an amount of a salt represented by the following formula (I) in a polymerizable liquid crystal material which comprises a polymerizable liquid crystal compound being within a range of more than 0 part by mass and less than 0.01 parts by mass per 100 parts by mass of the polymerizable liquid crystal compound, and an amount of a nitrogen-containing compound represented by the following formula (II) in the polymerizable liquid crystal material being within a range of more than 0 part by mass and 0.01 parts by mass or less per 100 parts by mass of the polymerizable liquid crystal compound, with an elemental analyzer, a nuclear magnetic resonance analyzer, or an ion chromatograph analyzer; and a second step of mixing the polymerizable liquid crystal material with an organic solvent,

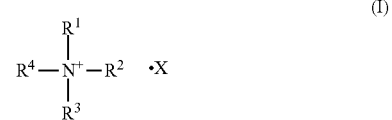

where R$^1$ to R$^4$ each independently represent a hydrogen atom or a C1-C7 alkyl group, and X represents F$^-$, Br$^-$, Cl$^-$, I$^-$, HsO$_4^-$, 1/2(HPO$_4^{2-}$), H$_2$PO$_4^-$, R—C(=O)—O$^-$, 1/2($^-$O—(C=O)—R'—(C=O)—O$^-$) or R—SO$_3^-$, where R represents a hydrogen atom or a monovalent hydrocarbon group, and R' represents a single bond or a divalent hydrocarbon group,

where R$^5$ represents a hydrogen atom or a C1-C7 alkyl group, and R$^6$ and R$^7$ represent a hydrogen atom.

* * * * *